United States Patent
Zhang

(10) Patent No.: US 12,508,082 B2
(45) Date of Patent: Dec. 30, 2025

(54) PARAMETRIC CONTOUR MAP VISUALIZATION FOR NEEDLE GUIDE SYSTEM

(71) Applicant: CANON U.S.A., INC., Melville, NY (US)

(72) Inventor: Yu Zhang, Concord, MA (US)

(73) Assignee: CANON U.S.A., INC., Melville, NY (US)

( * ) Notice: Subject to any disclaimer, the term of this patent is extended or adjusted under 35 U.S.C. 154(b) by 424 days.

(21) Appl. No.: 18/046,306

(22) Filed: Oct. 13, 2022

(65) Prior Publication Data

US 2024/0122653 A1    Apr. 18, 2024

(51) Int. Cl.
  *A61B 34/20* (2016.01)
  *A61B 34/30* (2016.01)
  *A61B 90/00* (2016.01)

(52) U.S. Cl.
  CPC .............. *A61B 34/20* (2016.02); *A61B 34/30* (2016.02); *A61B 90/39* (2016.02)

(58) Field of Classification Search
  CPC ........ A61B 17/3403; A61B 2017/3407; A61B 2034/102; A61B 2034/107; A61B 2034/2059; A61B 2090/3966; A61B 34/20; A61B 34/30; A61B 90/11; A61B 90/39
  See application file for complete search history.

(56) References Cited

U.S. PATENT DOCUMENTS

| | | |
|---|---|---|
| 3,641,484 A | 2/1972 | White et al. |
| 6,782,288 B2 | 8/2004 | Truwit et al. |
| 7,636,420 B2 | 12/2009 | Spies et al. |
| 7,871,406 B2 | 1/2011 | Nields et al. |
| 8,267,927 B2 | 9/2012 | Dalal et al. |
| 8,320,711 B2 | 11/2012 | Altmann et al. |
| 8,731,643 B2 * | 5/2014 | Von Roden ............ A61B 6/466 600/407 |

(Continued)

FOREIGN PATENT DOCUMENTS

WO    WO-2016056838 A1 *   4/2016  ............. A61B 10/02

OTHER PUBLICATIONS

Translated Lee WO2016046838 (Year: 2016).*

(Continued)

*Primary Examiner* — Brooke Lyn Klein
(74) *Attorney, Agent, or Firm* — CANON U.S.A., INC. IP DIVISION

(57) ABSTRACT

Disclosed herein are planning, navigation and simulation systems and methods for minimally invasive image-guided percutaneous intervention in which the planning method and system use patient-specific pre-operative images and instrument-specific parameters to generate a planned insertion path. A system includes a needle guide device that interfaces with a computing device to guide a needle-like probe towards target location within an anatomy of a subject. The computing device includes a processor configured to receive volumetric image data of the anatomy of the subject, and data about parameters of the needle guide device. One or more algorithms executed by the processor provide direct visualization of a parametric contour map superposed on an image of the patient's skin surface. A user can choose an optimal insertion point for the planned insertion path based the parametric contour map.

21 Claims, 9 Drawing Sheets

(56) References Cited

U.S. PATENT DOCUMENTS

| | | |
|---|---|---|
| 8,995,738 B2 | 3/2015 | Hernando et al. |
| 9,025,858 B2 | 5/2015 | Seong |
| 9,076,222 B2 | 7/2015 | Bal |
| 9,317,927 B2 | 4/2016 | Hamarneh et al. |
| 9,330,490 B2 | 5/2016 | Weersink et al. |
| 10,650,587 B2 | 5/2020 | Lu et al. |
| 10,695,132 B2 | 6/2020 | Desai et al. |
| 10,729,499 B2 | 8/2020 | Liu et al. |
| 11,051,769 B2 | 7/2021 | Brunicardi |
| 11,197,723 B2 | 12/2021 | Kato |
| 11,213,315 B2 | 1/2022 | Kincaid |
| 11,232,572 B2 | 1/2022 | Chen et al. |
| 11,253,314 B2 | 2/2022 | Brink et al. |
| 11,317,972 B2 | 5/2022 | Bonillas Vaca |
| 2008/0091101 A1 | 4/2008 | Velusamy et al. |
| 2009/0131783 A1 | 5/2009 | Jenkins et al. |
| 2009/0148012 A1 | 6/2009 | Altmann et al. |
| 2012/0106809 A1 | 5/2012 | Lee et al. |
| 2012/0226145 A1 | 9/2012 | Chang et al. |
| 2013/0274778 A1 | 10/2013 | Mercier et al. |
| 2015/0148660 A1 | 5/2015 | Weiss et al. |
| 2016/0070436 A1 | 3/2016 | Thomas et al. |
| 2016/0335413 A1 | 11/2016 | Davidson et al. |
| 2017/0100195 A1 | 4/2017 | Velusamy |
| 2018/0242901 A1 | 8/2018 | Bames et al. |
| 2019/0282301 A1* | 9/2019 | Bonillas Vaca ........ A61B 90/37 |
| 2019/0371474 A1 | 12/2019 | Borsic |
| 2020/0046435 A1 | 2/2020 | Ladtkow et al. |
| 2020/0054378 A1* | 2/2020 | Kincaid ................... A61B 6/12 |
| 2020/0121393 A1 | 4/2020 | Nakamura et al. |
| 2021/0212569 A1 | 7/2021 | Dura et al. |
| 2021/0259660 A1* | 8/2021 | Bharat ................... A61B 8/463 |
| 2021/0366108 A1 | 11/2021 | Kane et al. |
| 2022/0101602 A1 | 3/2022 | Serrat et al. |
| 2022/0211270 A1* | 7/2022 | Itkowtiz ................. A61B 34/10 |
| 2024/0050172 A1* | 2/2024 | Wu ......................... G06T 7/337 |

OTHER PUBLICATIONS

Lorensen, W.E., et al., "Marching Cubes: A High Resolution 3D Surface Construction Algorithm", Computer Graphics, Jul. 1987, pp. 163-169, vol. 21, No. 4.

Shu, J.H., et al., "An Improved Mask R-CNN Model for Multiorgan Segmentation", Mathematical Problems in Engineering, 2020.

Skala, V., et al., "Two Methods for ISO-Surface Extraction from Volumetric Data and Their Comparison", Machine Graphics &Vision, 2000, pp. 149-166, vol. 9, No. 1/2.

\* cited by examiner

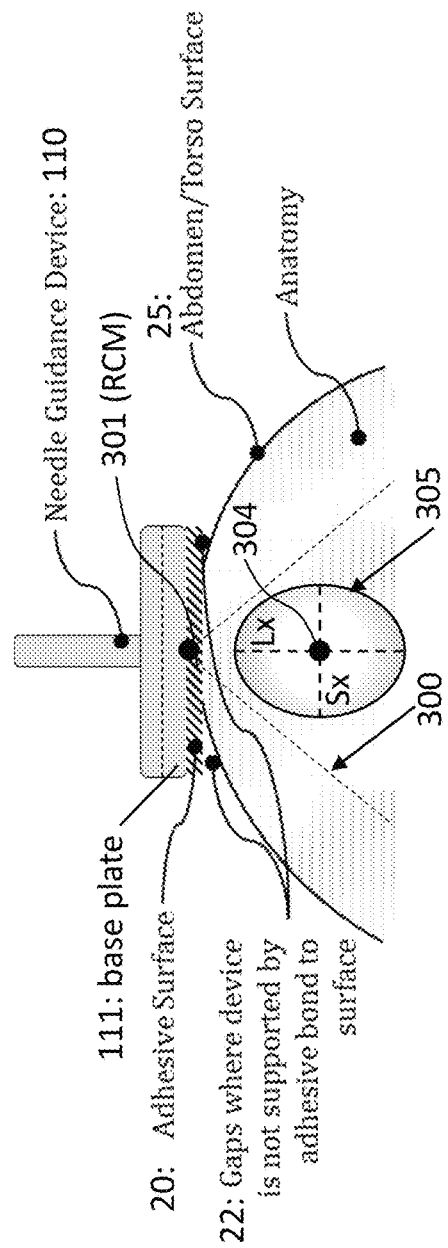
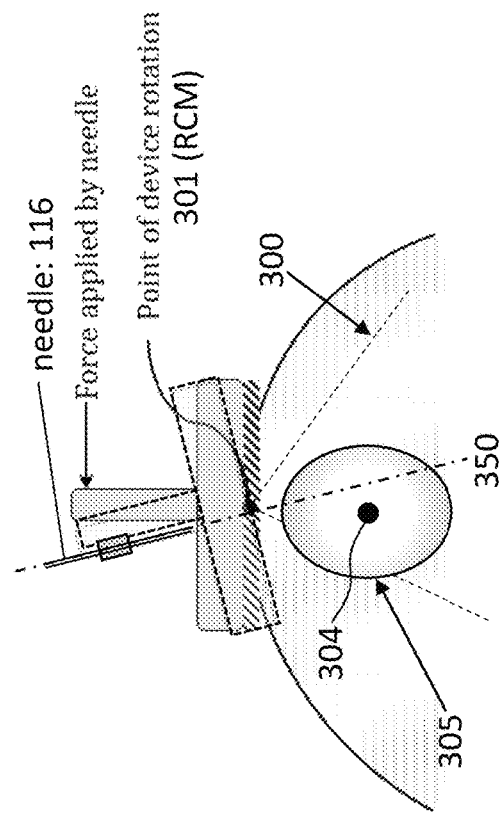
FIG. 3A
FIG. 3B

PARAMETRIC CONTOUR MAP VISUALIZATION FOR NEEDLE GUIDE SYSTEM

CROSS-REFERENCE TO RELATED APPLICATIONS n/a

BACKGROUND INFORMATION

Field of Disclosure

The present disclosure relates to data processing and visualization of medical image data. More particularly, the disclosure is directed to system and methods for image analysis of volumetric image data and parametric contour map visualization for positioning a medical device on the skin surface of a patient. In one exemplary embodiment, parametric contour map visualization is applicable for simulating the mounting of a needle guide system (NGS) on the body of a patient for minimally invasive surgery (MIS).

Description of Related Art

Image-guided percutaneous (through the skin) interventions such as ablation and biopsy are well-established in vivo treatment techniques that continue to evolve. For percutaneous ablation, a hollow needle-like probe is inserted into a tumor or lesion deep inside the body of a patient with the aid of intra-operative medical imaging. Examples of intra-operative medical imaging modalities include, but are not limited to, X-ray computed tomography (CT), real-time X-ray (fluoroscopy), magnetic resonance imaging (MRI), positron emission tomography (PET), single-photon emission computed tomography (SPECT), Ultrasound (US), etc. Solid tumors, such as those found in the liver, prostate, lung, breast, and kidney often are ablated using cryoablation. In cryoablation, a clinician typically passes the probe into the body through a skin insertion point until the tip of the probe reaches a location inside or adjacent to diseased tissue. Then, cooled, thermally conductive fluid such as liquid nitrogen is pumped through the hollow needle-like probe into the target tissue until ice crystals form within the tissue cells, and the local tissue freezes into a small volume generally referred to as an "ice ball". With the ice ball enclosing the tumor, ablation occurs in the frozen tissue and the diseased tissue is destroyed. Other ways to surgically destroy diseased tissue include radiofrequency ablation (RFA), microwave ablation (MWA), laser ablation, irreversible electroporation (IRE), and chemical ablation such as using absolute alcohol (chemoablation), among others.

For an ablation procedure, the physician must select an adequate probe or probes that will fully ablate the tumor to reduce the risk of tumor recurrence. At the same time, the physician must provide a safety margin surrounding the tumor to avoid unintended ablation of healthy tissue, bone, or delicate organs around the tumor. In many cases, a single probe cannot achieve full tumor ablation, and thus multiple probes are used in larger ablation zones to ensure full tumor removal. Image guided biopsy is a procedure which involves using a hollow needle-like probe to withdraw tissue or fluid from a lesion of interest inside a patient's body in order to but not limited to finding out the nature of a tumor or the type and severity of disease. The biopsy needle is guided into the patient's body, while an imaging modality (e.g., CT, US, MRI, etc.) continuously scans the patient's body. Using the scanned images as a guide, the clinician can place the tip of the needle at the spot where the biopsy is needed, and take out a tiny piece of tissue that can be tested in the lab.

In ablation and/or biopsy procedures, a preset probe configuration is desired in each modality. For example, in microwave and IRE ablation a parallel probe configuration is preferred. In a parallel probe arrangement, the probes need to be guided parallel to each other at a preset maximum distance. The preset maximum distance ensures that a large uniform ablation zone is formed around a region of interest (e.g., tumor). Exceeding the maximum probe distance can result in independent ablation zones around each probe, and this can lead to missed tumor cells between probes causing tumor recurrence. In cryoablation, some physicians prefer to bracket the tumor in a conical probe arrangement in order to ensure that all insertion points of the probes are in close proximity. In other words, in cryoablation, it is preferred to share a single insertion point or to use insertion points in close proximity to each other to guide all probes into the tumor. In this manner, the physician can more easily protect the patient's skin from, for example, cryo-burns by applying warm saline around the probe insertion point or points.

In current practice, for image guided percutaneous interventions (e.g., biopsy or ablation), a target point is first identified using medical images acquired by imaging modalities such as x-ray fluoroscopy, ultrasound, CT, MRI, PET, SPECT, or combinations thereof. Based on the target point identified by these medical images, an insertion point on the skin surface is also usually identified to plan an insertion trajectory for the probe or probes. To aid in directing the probe along the planned trajectory a needle guidance device, such as a robotic needle guide system (hereinafter "NGS device") has been developed. To reduce surgery time and minimize burden on the patient, planning techniques have been proposed in which the placement of an NGS device and the needle insertion path can be virtually visualized by simulation before the biopsy or ablation probe is advanced into a target tumor of a patient. See for example, U.S. patent Ser. No. 11/317,972 B2, which are hereby incorporated by reference for all purposes.

U.S. patent Ser. No. 11/317,972 describes an algorithm for registering a virtual NGS device model to the image space automatically, and approximating the most likely configuration of the needle guide device on the skin surface before the actual device is placed on the patient. The virtual model of the needle guide device and its reachable area are then overlaid on the planning image data, in order to visualize and quantify the reachability of the target. During the in vivo procedure, the actual needle guide device is placed on the patient, and new images are acquired. The device can be identified in the new images, and thus registered to the image space. It can then be confirmed whether the target is reachable.

However, the geometry and size of the needle guide device, the length and weight of the needle, the anatomy of the patient's skin surface, movement of the patient and/or movement of internal organs place constraints on the region reachable by the needle. For example, given that planning and needle placement take place at different time points in the procedure, it is important to estimate potential targeting accuracy due to the motions of the body surface and/or internal organs. In a clinical scenario, patient motion is induced by the deformation of the chest and abdominal areas, for example, due to respiratory motion, and thus the spatial relationship between the NGS device and the target can be continuously changing throughout the procedure. Moreover, even in the case where there is no patient motion, the target may change position due to internal organ movement or tissue displacement caused by the needle insertion. Specifically, needles of different size and length are adopted for percutaneous image-guided interventions. Commonly applied needles have a diameter ranging from 0.4 mm (27 gauge) to almost 4.6 mm (7 gauge). Therefore, as the needle is inserted into the patient, internal organs may be displaced because the thickness of the needle occupies a physical space along its trajectory, and this may cause the target location to shift even without patient movement. For this reason, a specific challenge of mounting the NGS device to the patient is that the position and orientation of the NGS device is unknown until it is physically mounted on near the patient's skin. Since the NGS device will not be present on the patient while reviewing the planning image, misplacement of the NGS device, where the target point turns out to be out of the needle's accessible range may occur.

Therefore, there remains a need for improved systems and methods of needle-guidance planning.

SUMMARY OF EXEMPLARY EMBODIMENTS

The present disclosure provides improved systems and methods for planning and navigation of a needle guide device that uses specialized software algorithms to provide direct visualization of the relevant factors that determine an optimal insertion point location by displaying a parametric contour map on an image the of patient's skin surface together with an image of the needle guidance device.

According to at least one embodiment, the present disclosure provides systems and methods for performing image analysis and simulation of needle insertion paths using patient-specific pre-operative images and instrument-specific parameters in percutaneous needle insertions. A system includes a needle guide device (NGS) that interfaces with a computing device to guide a needle to a target region within a patient. The computing device includes a memory and a processor configured to receive pre-operative image data of an anatomy of the patient and NGS parameters. The processor identifies a shape of the anatomy of the patient by analyzing the image data and determines an insertion point for guiding a needle to the target region based on the shape of the anatomy and the NGS parameters. A model is created to represent an insertion trajectory of the needle guided by the NGS passing through the insertion point and reaching the target region. A predicted path for guiding the needle with the NGS is generated using the model.

According to further embodiments, a visualization graphic user interface (GUI) will display the final parametric map. An associated control panel (within the GUI) will present a list of modifiable parameters (average weighted values) with sliding controls that the user can drag in one or more directions to interactively change values. Default values will be set at the beginning corresponding to the initially displayed color map. When the weights are adjusted by the user, the color map and predicted path will be changed real time.

These and other objects, features, and advantages of the present disclosure will become apparent upon reading the following detailed description of exemplary embodiments of the present disclosure, when taken in conjunction with the appended drawings, and provided claims.

BRIEF DESCRIPTION OF DRAWINGS

In FIG. 1, a parametric contour map 800 is overlaid on top of a coronal image to help a physician to place the needle guide device 110 on the patient 12;

FIG. 3A and FIG. 3B illustrate side views of a needle guide device 110 mounted on the skin surface 25 of a patient's body;

DETAILED DESCRIPTION OF EXEMPLARY EMBODIMENTS

Figure 1:
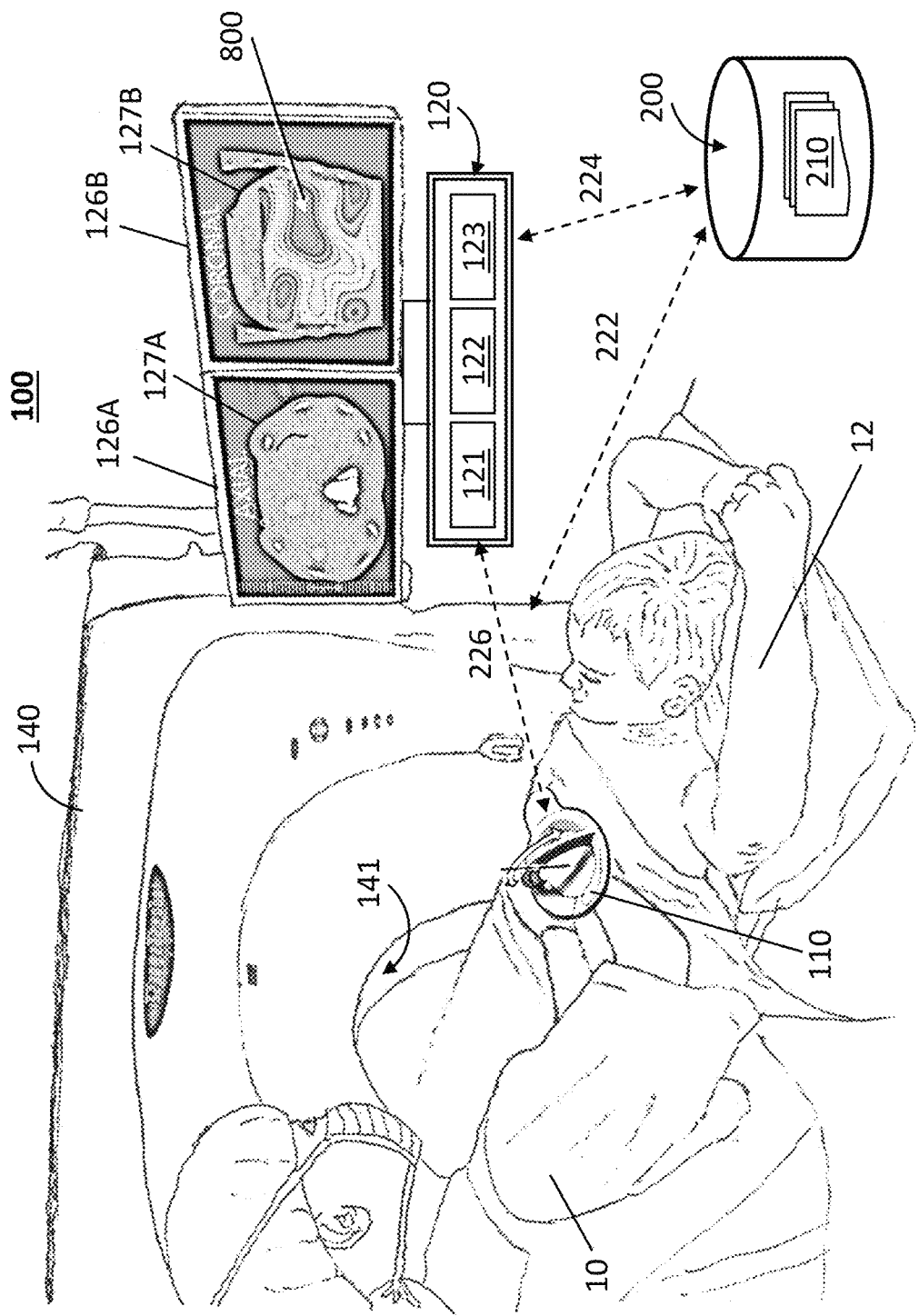
FIG. 1 illustrates a system 100 comprising a needle guide device 110 that interfaces with a computing device to guide a needle 116 from a skin surface to a target location within an anatomical portion of a patient 12.

Before the various embodiments are described in further detail, it shall be understood that the present disclosure is not limited to any particular embodiment. It is also to be understood that the terminology used herein is for describing exemplary embodiments, and is not intended to be limiting. Embodiments of the present disclosure may have many applications within the field of medical treatment or minimally invasive surgery (MIS).

Throughout the figures, the same reference numerals and characters, unless otherwise stated, are used to denote like features, elements, components or portions of the illustrated embodiments. In addition, while the subject disclosure is described in detail with reference to the enclosed figures, it is done so in connection with illustrative exemplary embodiments. It is intended that changes and modifications can be made to the described exemplary embodiments without departing from the true scope of the subject disclosure as defined by the appended claims. Although the drawings represent some possible configurations and approaches, the drawings are not necessarily to scale and certain features may be exaggerated, removed, or partially sectioned to better illustrate and explain certain aspects of the present disclosure. The descriptions set forth herein are not intended to be exhaustive or otherwise limit or restrict the claims to the precise forms and configurations shown in the drawings and disclosed in the following detailed description.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached", "coupled" or the like to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown in one embodiment can apply to other embodiments. It will also be appreciated by those of skill in the art that references to a structure or feature that is disposed "adjacent" to another feature may have portions that overlap or underlie the adjacent feature.

The terms first, second, third, etc. may be used herein to describe various elements, components, regions, parts and/or sections. It should be understood that these elements, components, regions, parts and/or sections are not limited by these terms of designation. These terms of designation have been used only to distinguish one element, component, region, part, or section from another region, part, or section. Thus, a first element, component, region, part, or section discussed below could be termed a second element, component, region, part, or section merely for purposes of distinction but without limitation and without departing from structural or functional meaning.

As used herein, the singular forms "a", "an", and "the" are intended to include the plural forms as well, unless the context clearly indicates otherwise. It should be further understood that the terms "includes" and/or "including", "comprises" and/or "comprising", "consists" and/or "consisting" when used in the present specification and claims, specify the presence of stated features, integers, steps, operations, elements, and/or components, but do not preclude the presence or addition of one or more other features, integers, steps, operations, elements, components, and/or groups thereof not explicitly stated. Further, in the present disclosure, the transitional phrase "consisting of" excludes any element, step, or component not specified in the claim. It is further noted that some claims or some features of a claim may be drafted to exclude any optional element; such claims may use exclusive terminology as "solely," "only" and the like in connection with the recitation of claim elements, or it may use of a "negative" limitation.

The term "about" or "approximately" as used herein means, for example, within 10%, within 5%, or less. In some embodiments, the term "about" may mean within measurement error. In this regard, where described or claimed, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range, if recited herein, is intended to be inclusive of end values and includes all sub-ranges subsumed therein, unless specifically stated otherwise. As used herein, the term "substantially" is meant to allow for deviations from the descriptor that do not negatively affect the intended purpose. For example, deviations that are from limitations in measurements, differences within manufacture tolerance, or variations of less than 5% can be considered within the scope of substantially the same. The specified descriptor can be an absolute value (e.g. substantially spherical, substantially perpendicular, substantially concentric, etc.) or a relative term (e.g. substantially similar, substantially the same, etc.).

Unless specifically stated otherwise, as apparent from the following disclosure, it is understood that, throughout the disclosure, discussions using terms such as "processing," "computing," "calculating," "determining," "displaying," or the like, refer to the action and processes of a computer system, or similar electronic computing device, or data processing device that manipulates and transforms data represented as physical (electronic) quantities within the computer system's registers and memories into other data similarly represented as physical quantities within the computer system memories or registers or other such information storage, transmission or display devices. Computer or electronic operations described in the specification or recited in the appended claims may generally be performed in any order, unless context dictates otherwise. Also, although various operational flow diagrams are presented with numbered blocks or steps in a sequence(s), it should be understood that the various operations may be performed in other orders than those which are illustrated or claimed, or operations may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to", "in response to", "related to", "based on", or other like past-tense adjectives are generally not intended to exclude other variants, unless context dictates otherwise.

The present disclosure generally relates to medical devices, and it exemplifies embodiments of a needle guidance device configured to be mounted onto a patient's body at a predetermined position and orientation. As used herein, the term "position" refers to the location of an object or a portion of an object in a three-dimensional space (e.g., three degrees of translational freedom along Cartesian X, Y, Z coordinates); the term "orientation" refers to the rotational placement of an object or a portion of an object (three degrees of rotational freedom—e.g., roll, pitch, and yaw); the term "posture" refers to the position of an object or a portion of an object in at least one degree of translational freedom and to the orientation of that object or portion of object in at least one degree of rotational freedom (up to six total degrees of freedom); the term "shape" refers to a set of posture, positions, and/or orientations measured along the elongated body of the object.

As it is known in the field of medical devices, the terms "proximal" and "distal" are used with reference to the manipulation of an end of an instrument extending from the user to a surgical or diagnostic site. In this regard, the term "proximal" refers to the portion (e.g., a handle) of the instrument closer to the user, and the term "distal" refers to the portion (tip) of the instrument further away from the user and closer to a surgical or diagnostic site. It will be further appreciated that, for convenience and clarity, spatial terms such as "vertical", "horizontal", "up", and "down" may be used herein with respect to the drawings. However, surgical instruments are used in many orientations and positions, and these terms are not intended to be limiting and/or absolute.

The term "patient" is generally synonymous with the term "subject" and includes all mammals including humans. Examples of patients may include humans, livestock, and companion animals. The term "contour map" may also be called an "elevation map" or a "depth map", such map has the form of an image in which the pixel values indicate topographical information, rather than brightness and/or color of objects in the image. The terms "contour map", "depth map" and "elevation map" refer to a two-dimensional (2D) image representing three-dimensional (3D) information. Therefore, the terms "3D map" may also be used herein interchangeably with "contour map". In other words, in the description and in the claims, the term "contour map" refers to a representation of an image as a two-dimensional matrix of pixels, in which each pixel corresponds to a respective location in the image and has a respective parametric value.

As described above, path planning for tumor ablation requires volume imaging (3D imaging) to visualize insertion trajectories and ablation scenarios. The amount (size) of volumetric data generated by medical imaging modalities has increased significantly due to the dramatic advances in imaging modalities and computing technologies. To help surgeons find better paths more quickly, computer-assisted trajectory planning needs to be improved. The present disclosure provides improved systems and methods that allow the software to provide user direct visualization of the relevant factors that determines the optimal insertion point location by projecting a parametric contour map on patient's skin surface. Hence making the user's choice of insertion point more intuitive and convenient.

<System for Visualization of Image-Guided Percutaneous Needle Insertion>

FIG. 1 illustrates an exemplary system wo configured for pre-operative planning, needle path simulation, and intra-operative navigation during image-guided percutaneous interventions. Percutaneous interventions can include, but are not limited to, acquiring a biopsy specimen and/or performing tumor ablation. The system 100 includes, for example, a system console 120, a server 200, a needle guide device 110, and an image scanner 140. The console 120 may be implemented as an ablation or biopsy cart that can be transported to an operating room (OR). The console 120 may include one or more than one processor 121 along with memory 122, system interface 123, and one or more display devices 126. The processor 121 may include a central processing unit (CPU) or other data processing component (e.g., distributed cloud computing) equipped with software and/or hardware for implementing pre-operative planning and intra-operative navigation during percutaneous interventions. The server 200 may include, an image server, such as Picture Archiving and Communication System (PACS) server, a Hospital Information System (HIS) server, or a Radiology Information System (RIS) server. The image scanner 140 may include one or more imaging modalities such as a CT scanner, a MRI scanner, a US scanner, or other scanning apparatus configured to acquire volumetric data of at least an anatomy of interest of a patient. In one embodiment, the imaging scanner 140 may include a bore 141 configured to receive the patient 12 for performing one or more of a pre-operative imaging, intra-operative imaging, or post-operative imaging operation. The image scanner 140 communicates with the server 200 and other components of system 100 via a wired or wireless link 222.

The computer 124 communicates with the server 200 and with other components of the system wo via a wired or wireless link 224. Computer 124 refers to any machine that operates to accept a structured input, processes the structured input according to prescribed rules (a program), and produces one or more results as output. The needle guide device 110 is configured to communicate with the console computer 124 and with other components of the system wo via a wired or wireless communication link 226. Attached to the console 120 may be provided input devices such as a touchscreen, a keyboard, a mouse, and output devices, such as a speaker and one or more monitor 126A-126B. The monitor 126A and 126B may be an electronic display device (e.g., liquid crystal display (LCD) or OLED display) configured to display images, such as an image of an ablation plan and/or an image of a target to be ablated. The console 120 may be used by a user 10 (e.g., a surgeon and/or an interventional radiologist (IR)) to treat a patient 12 using the needle guide device 110. To that end, the needle guide device 110 is configured to guide a needle-like probe (a needle 116 in FIG. 2A) through an opening 115 into a region of interest of patient 12. In the console 120, the processor 121 may process image data acquired from the image scanner 140 or from the server 200. The first monitor 126A can display a first view 127A (e.g., an axial view), and the second monitor 126B may display a second view 127B (e.g., a coronal view) of the anatomy of patient 12 to plan a needle path for guiding a needle 116 towards a target point. In FIG. 1, the second view 127B illustrates the manner in which a contour map 800 can be overlaid on top of a coronal image of a torso of a patient to assist a physician in determining the optimal position for mounting the needle guide device 110 onto the patient 12.

<Needle Guide Device (NGS)>

Figure 2B:
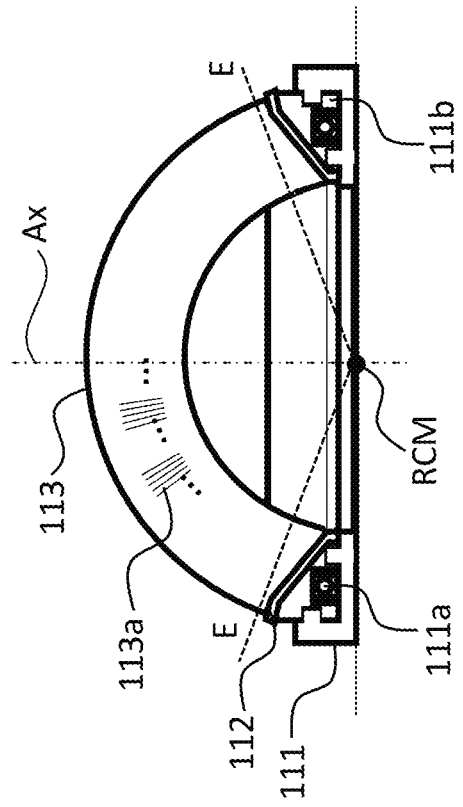
FIG. 2B illustrates a cross-section of the needle guide device 110.
Figure 2A:
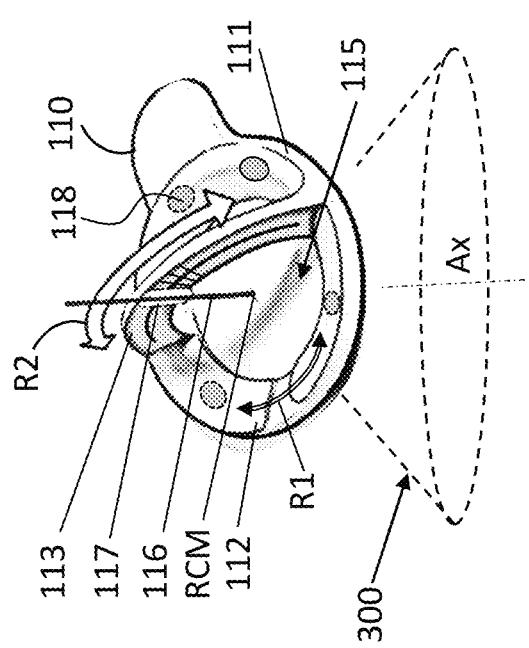
FIG. 2A illustrates an isometric view of a needle guide device 110.

FIG. 2A shows an isometric projection of the needle guide device 110 which can be used to insert a needle-like probe into a patient. As used herein, a needle-like probe may include an ablation needle, a catheter, a miniature endoscope, a biopsy needle, and the like. FIG. 2B shows a cross-sectional view of the needle guide device 110. The needle guide device 110 includes a base plate 111, a rotatable ring 112, an arc guide 113, a needle holder 117, and a plurality of fiducial markers 118. Fiducial markers 118 can be radiopaque beads provided embedded in the base plate 111 and/or the rotatable ring 112 and/or the arc guide 113. The base plate 111 can be a substantially flat disk with a circular opening 115, and is configured to be attachable to the patient's skin surface by, for example, using adhesive tape or straps. The base plate 111 has a flat bottom surface; therefore, the needle guide device 110 should be mounted on a substantially flat portion of the patient's skin surface. The needle guide device 110 has a remote center of motion (RCM) which coincides with the center of rotatable ring 112. The RCM also coincides with the center of the arc guide 113, and with the center of the disk-shaped base plate 111. The RCM also coincides with the center of mass (or center of gravity) of the needle guide device 110.

The rotatable ring 112 is mounted on the base plate 111, and is configured to rotate on top of the base plate 111 around the RCM by a rotational movement (R1). The base plate 111 and the rotatable ring 112 both have a circular inner opening 115 to allow access of instruments such as the needle 116 to be guided into the patient 12. The opening 115 may also allow access for a hand or finger of the user to visualize and/or manipulate the needle 116 with respect to the patient. The arc guide 113 is attached to, or integrally formed with, the rotatable ring 112, perpendicular thereto, so that the arc guide 113 diametrically connects the rotatable ring 112 at two locations diametrically opposite to each other. In some embodiments, the arc guide 113 may be attached to, or integrated with, the rotatable ring only at one end of the arc guide while the other end remains disconnected. For example, a first end of the arc guide is attached to the rotatable ring 112, while a second end of the arc guide expands diametrically opposite to the first end, but does not reach the rotatable ring. In a further embodiment, one or both ends of the arc guide 113 can be hinged or clipped onto the rotatable ring 112, so that the arc guide can be partially or completely removed from the rotatable ring 112. In other embodiments, the arc guide 113 and rotatable ring 112 can be removable from the base plate 111 after needle insertion. Examples of the various manners in which the arc guide 113 can be attached to the rotatable ring 112 are shown and described in applicant's previous disclosure of pre-grant patent application publication US 2020/0054378 A1, which is incorporated by reference herein for all purposes.

The needle holder 117 is movably mounted on the arc guide 113. That is, the needle holder 117 can move along the arc guide 113 in an arcuate path. In this manner, the needle holder 117 is configured to hold one or more than one needle 116 with two or more degrees of freedom. For example, when a needle 116 is mounted on the needle guide device 110, the rotatable ring 111 can rotate about the RCM executing a first rotational movement (R1), and the needle holder 117 can slide along the arc guide 113 executing a second rotational movement (R2). In at least some embodiments, the rotation of rotatable ring 112 (i.e. the first rotational movement R1) can be implemented by a robotic system using motors or actuators. To facilitate rotation and tracking of the rotatable ring 112 with respect to base plate 111, the needle guide device 110 may include one or more of bearings 111a, and an encoder 111b. Examples of a robotic controlled needle guide device 110 are described in previous disclosures of U.S. Pat. Nos. 9,222,996 B2, 987, 673 B2, 10,274,553 B2, and 10,285,670 B2, which are hereby incorporated by reference herein for all purposes.

When a needle 116 is mounted on needle guide device 110, the needle 116 can be moved by executing the first rotational movement R1 and the second rotational movement R2 while the needle 116 passes through the RCM and advances into the patient. The first rotational movement R1 can be tracked by encoder 111b, and the second rotational movement R2 can be tracked by angular reference marks 113a provided along a surface of the arc guide 113. In this manner, the needle 116 is able to reach a conical region having an apex located at the RCM and a circular base below the base plate 111. Hereinafter, the conical region, which can be reached by the needle 116, is referred to as the "reachable zone 300" of needle guide device 110. The reachable zone 300 is a conical region centered on an axis Ax, which is the rotation axis of the rotatable ring 112. The rotation axis Ax intersects the RCM of the needle guide device 110 at the bottom surface of the base plate 111, as shown in FIG. 2B. The reachable zone 300 is limited by the zenith angle of needle guide device 110, and the length of insertion (insertion depth) of needle 116. The zenith angle is the angle between the needle 116 and the normal to the center of rotatable ring 112. The elevation angle is the angle between the rotatable ring 112 (the horizontal plane) and the needle 116. The zenith angle is similar to the elevation angle but it is measured from the vertical plane to the needle, whereas the elevation angle is measured from the horizontal plane to the needle. In other words, the zenith angle=90°−elevation angle. When the needle is perpendicular to the rotatable ring 112 (perpendicular to the horizontal plane), the zenith angle is zero and the elevation angle is 90°; when the needle is at 45 degrees with respect to the rotatable ring 112, the zenith angle and the elevation angle are both 45°. Notably, due to the geometry of needle guide device 110 (e.g., due to the thicknesses of the base plate 111 and the rotatable ring 112), the elevation angle of needle 116 is limited to a minimum elevation angle shown by dashed lines E on FIG. 2B. In one embodiment, the minimum elevation angle is about 20 degrees.

In operation, the user 10 performs image-guided percutaneous (through the skin) interventions on patient 12 using needle guide device 110, while relying on intra-operative images acquired by the image scanner 140. To that end, the user 10 would place the base plate 111 of needle guide device 110 on the patient's skin surface, and secure the needle guide device 110 using adhesive tabs, straps, or a combination of straps and adhesives tabs. An example of using adhesive tabs to secure a needle guide device to a patient is described in applicant's previously disclosed U.S. patent Ser. No. 11/213,315 B2, which is incorporated by reference herein for all purposes. Once the needle guide device 110 is attached to the patient, the user would rotate the rotatable ring 112, and slide the needle holder 117 along the arc guide 113 to insert a needle 116 at an appropriate elevation angle to enter the skin surface through the center of opening 15. Ideally, an image-guided procedure would allow fast needle guidance so that the needle can reach a target location within the patient's anatomy in short time. However, one of the challenges that occurs when the needle guide device 110 is mounted directly on the patient's body is that the base plate 111 may not fully contact the skin surface of the patient due to the shape of the skin surface in relation to the patient's anatomy (i.e., organ location).

FIG. 3A and FIG. 3B illustrate side views of needle guide device 110 mounted on the skin surface of a patient's anatomy. These images represent a common issue that occurs when a needle guide device 110 is mounted directly on the skin surface of a patient. As seen in FIG. 3A, the base plate 111 of needle guide device 110 can be attached to the patient's anatomy via an adhesive surface 20 (e.g., adhesive tape or a disposable skin marking grid). In other examples, needle guide device 110 can be attached to the patient 12 with straps (not shown). The needle guide device 110 is intended to guide a needle-like probe towards a tumor 305. The tumor 305 has a long axis Lx and a short axis Sx. Ideally, a tip of the needle-like probe should reach a target point 304, which is the approximate center of tumor 305.

Initially, as shown in FIG. 3A, the tumor 305 is appropriately aligned with an insertion point 301, and the entire tumor 305 is within the reachable zone 300 of needle guide device 110. However, since the anatomy of the patient is curved, the base plate in of needle guide device 110 creates gaps 22 where the base plate 111 does not fully contact the patient's skin surface 25. These gaps 22 are regions where the needle guide device is not fully supported. Therefore, when a needle 116 is mounted on the needle guide device, a force due to the weight and/or manipulation of the needle causes the needle guide device to become misaligned with respect to the tumor 305.

FIG. 3B illustrates an scenario where, when a force is applied to needle guide device 110 (e.g., when a needle 116 of significant weight is mounted to the needle holder 117), the needle guide device 110 can move or change its orientation causing the arc guide 113 and/or needle 116 to become inclined. As result, the reachable zone 300 shifts, and the target point 304 is no longer aligned with a planned insertion path 350. Moreover, the tumor 305 is no longer contained entirely within the reachable zone 300. Evidently, the stability of the instrument becomes compromised, as well as the accuracy of needle placement with respect to the target point 304 and tumor 305 is negatively affected. Ultimately, this results in lower efficacy of treatment. Additional limitations to the success of percutaneous needle procedures include the presence of critical structures such as bones, major blood vessels, nerves and other sensitive features in the body of the patient that may not allow needle 116 to reach the target point 304.

According to the present disclosure, the system 100 includes a software application referred to as Needle Visualization Tool (herein "NVT tool") configured to analyze patient-specific pre-operative images and simulate an optimal needle insertion trajectory (hereinafter referred to as a "planned insertion path") taking into consideration parameters of the patient's anatomy and instrument-specific parameters of the needle guidance device. The patients' anatomy includes the topography of the patient's skin surface where the needle guide device will be mounted, and the internal structures such as bones, organs, and/or critical tissue along the planned insertion path. One of the objectives of the present disclosure is to identify an optimal position for mounting the needle guide device on the skin surface of the patient using the NVT tool at the planning stage (i.e., before mounting the needle guide device on the patient). To that end, the NVT tool will generate a contour map registered with the patient's anatomy and with all relevant information of needle guide device 110, and will display the contour map on an image of the patient's skin surface. By observing the displayed image, the user can intuitively choose a location for an insertion point based on the contour map. When the user chooses a location for the insertion point, the NVT tool generates a planned insertion path from the chosen insertion point to a target point within the anatomy of the patient. If the chosen insertion point results in a planned insertion path that intersects with structures such as bone, organs, or vessels of the patient, the NVT tool allows the user to choose a different insertion point iteratively until an optimal insertion point is found. In this manner, the parametric contour map ensures that the system will provide all available information to the user in a context-based manner, and the visualization is controllable by the user, in order to determine the ideal location to place the needle guide device on the patient.

On or more of the proposed embodiments can assist the user in selecting the optimal insertion location, where the NGS device will be placed on the patient. Preferably, the location of an optimal insertion point matches with the NGS device RCM defined above. To that end, the system executes one or more software algorithms that incorporates multiple steps for processing the 3D medical data to retrieve necessary information such as a tumor model, as well as skin surface topology, bone location, and other critical tissue structures. Then, the system calculates a comprehensive parametric map, which will be displayed as a contour map with colors (or predetermined patterns) on top of the patient's anatomy superposed on the image of the patient's skin surface. This process will allow users to visualize the insertion point location and validate their choice within the context of the patient's anatomy. For example, a user may choose an insertion point located on the parametric contour map at the center of a relatively flat surface without any nearby blocks that may interfere with the stability of the NGS device base plate. The contour map may display areas of high confidence in "cool" colors (i.e., blue and green) and areas of low confidence in "hot colors" (i.e., yellow, orange, and/or red) corresponding to combinations of various parametric values, such as parameters of the anatomical portion and parameters of the needle guide device.

<Contour Map>

A contour map is a topographical map illustrated with contour lines, for example, a map that shows valleys and hills by a series of contour lines. In cartography, contour lines are imaginary lines that join points of equal elevation on the surface of land above or below a reference surface, such as the mean sea level. The interval (distance) between contour lines in a topographic map shows the difference in elevation between successive contour lines, which gives the magnitude of steepness (slopes) or flatness (valleys). In medical imaging, contour maps have been previously used to illustrate various aspects related to medical procedures.

For example, U.S. Pat. No. 7,871,406 discloses a thermal ablation system, which displays temperature changes throughout a volume of interest (VOI) in a patient by a series of contour lines (isothermal lines) where each contour region indicates a different range of temperatures. U.S. Pat. No. 8,320,711 discloses a method of creating an anatomical map of an organ by delineating contours in a plurality of two-dimensional (2D) ultrasound images, and combining the contours to produce the anatomical map. The contour corresponds to a feature that segments the image between internal and the external sections of the organ. Alternatively, the contour corresponds to the inner surface of a wall bounding the internal section of the organ.

In the present disclosure, a novel system and method uses patient specific pre-operative images and instrument-specific parameters to generate a parametric contour map, and to display the parametric contour map superposed on a representation of the patient's skin surface. In this manner, the system and methods disclosed herein provide increased confidence and intuitive visualization for a user to choose an optimal insertion point for a needle or needle-like probe, before mounting the needle guide device onto the patient skin surface.

Figure 4:
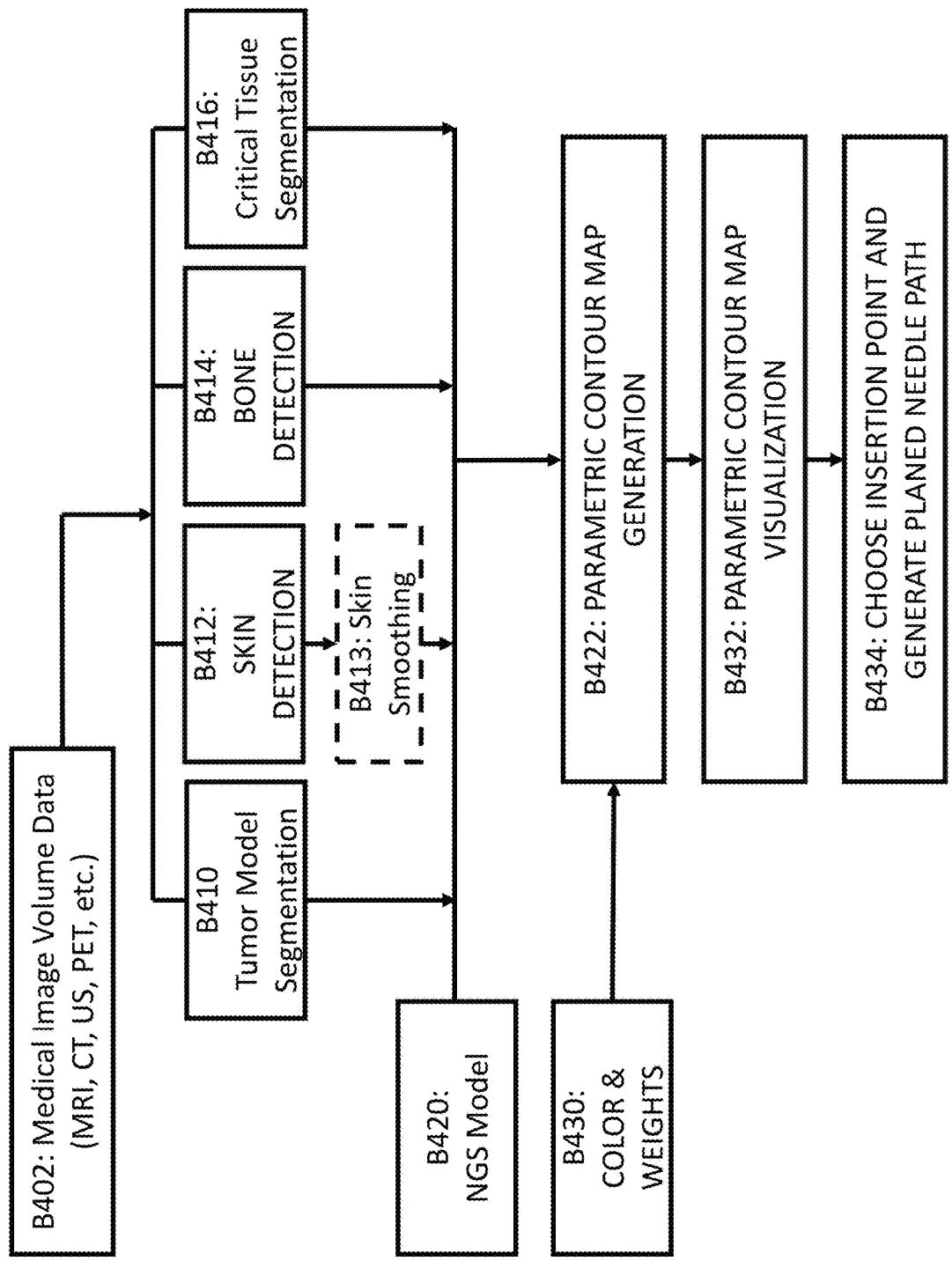
FIG. 4 shows a functional block diagram and overall workflow 400 for generating a parametric contour map, which can be visualized (displayed) on the skin surface of the patient's body.

FIG. 4 shows a functional block diagram representing an overall workflow 400 for generating a parametric contour map for skin surface visualization. First, at a block B402, medical volume data of a subject is acquired from one or more imaging modalities or from an image server such as a PACS server (e.g., server 200 shown in FIG. 1). Here, medical volume data of a subject refers to 3D data represented by voxel values. According to one embodiment, the software system acquires volumetric medical image data (3D data) of a subject from one or more imaging modalities (e.g., CT, MRI, US, PET, SPECT, etc.).

At block B410, a target tumor model (TTM) is generated from the 3D image data using a segmentation tool. In digital image processing, image segmentation is the process of partitioning a digital image into multiple image segments, also known as image regions or image objects (sets of pixels). Image segmentation is typically used to locate objects and boundaries (lines, curves, etc.) in images. The result of image segmentation is a set of segments that collectively cover the entire image, or, when dealing with edge detection, a set of contours extracted from the entire image. Each of the pixels in a region are similar with respect to some characteristic or computed property, such as color, intensity, or texture. When applied to a stack of images, which is typical in medical imaging, the resulting contours after image segmentation can be used to create 3D reconstructions with the help of interpolation algorithms like marching cubes. Segmentation of medical images typically corresponds to separation of anatomical structures, lesions, and various other objects, as required for visualization and/or quantification of certain structures (e.g., measuring volume, surface morphology, or shape properties).

An example of segmentation tool is the "D3 Slicer" tool, which is an open source multi-platform software package widely used for medical and biomedical imaging applications. In the 3D slicer tool, a region can be represented in different ways, for example as a binary labelmap or a closed surface map. In a binary labelmap, the value of each voxel specifies if that voxel is inside or outside a region. In a closed surface map, a surface mesh defines the boundary of a region. In the present disclosure, to obtain the target tumor model, the software system can use any known segmenting tool or technique. The tumor model should contain the actual tumor and some margin (a buffer) to ensure safe ablation coverage of the tumor. The term "target tumor model" refers to the specified tumor plus a margin that together ensure full ablation coverage. As used herein, the term "coverage" is equivalent to "inclusion", and it refers to the amount or extent to which something is covered or enclosed or included. An example of a method and system for determining a tumor margin for safe ablation coverage is disclosed, for example, in U.S. Pat. No. 9,076,222 B2, which is incorporated by reference herein for all purposes.

At block B412, a Skin Detection algorithm is applied to the volumetric data to detect the skin surface of the patient. Skin detection is the process of discriminating skin and non-skin regions in image data, and it is widely used in several applications ranging from hand gesture analysis to tracking body parts and face detection. A simple threshold-based and connectivity-enabled algorithm has been used by the inventor to generate the skin surface that can be used to display the parametric contour map. In one embodiment, the targeted skin surface used will be limited by two cross-sectional planes near the edges (but within) the scan data range and facing upwards in the direction where the insertion point is likely to be selected. In other words, the skin surface used to display the parametric contour map should include a region of the patient's skin where the needle guide device is likely to be mounted on the patient. An example of skin detection is described in the applicant's previously published U.S. patent Ser. No. 11/317,972, which is incorporated by reference herein for all purposes. This patent describes an algorithm for registering a virtual NGS device model to the image space automatically, and approximating the most likely configuration of the needle guide device on the skin surface before the actual device is placed on the patient.

At block B413, the resulting skin surface will be optionally smoothed for presenting the contour map at a later stage. There are many different smoothing algorithms available for 3D volume or surface smoothing. For example, one of the most commonly used skin-surface smoothing algorithms is known as Gaussian smoothing, which uses a Gaussian filter. In one embodiment, the smoothing process can be achieved by using one or more 3D Gaussian filters which will simulate to place the NGS device's base plate 111 (a flat disk) on the patient's skin. To that end, the parametric contour map should be preferably displayed without much distortion due to irregularities of the skin surface.

At block B414, a bone-detection algorithm or a segmentation algorithm to detect bone structure is used to label bones inside the volumetric data. The bone detection process is similar to a segmentation algorithm with different thresholds or other minor input variables. It is expected that the bone detection process will identify the objects with high Hounsfield Unit (HU) values, and separate those high HU values in 3D space, without worrying about internal variations. After bone detection, a 3D bone mask is created. Then, whether a planned insertion path touches the bone will be projected back onto the skin surface as an input for parametric map calculation, and the bone area will be assigned to some inhibitive values to indicate that such area (the bone area) is inaccessible for a planned insertion path.

In addition or alternatively, at block B414, it is also possible to detect bone structures (on the fly) along a virtual needle path. Specifically, instead of using a segmentation algorithm to generate a 3D bone mask prior to the parametric map calculations, it is possible to use a virtual needle path algorithm to sample the virtual needle path in real-time, and determine whether the virtual needle path hits (intersects) high HU bone values. If the virtual needle path hits bone values, the system assigns inhibitive values for the final output of the parametric map. Here, an option is that the system can use a certain threshold to analyze the 3D data, and classify the data as bone or bone-like structure based on the threshold. When conducting the parametric map calculation on each surface location, i.e., when the user chooses an insertion point, the system can calculate a path from the insertion point to the target point, by automatically tracing (drawing) a straight line from the insertion point to the target location. Then, the system can easily sample the HU values along this (virtual needle) path. If the system determines that one or more HU values is above the threshold, the system determines that this path is intersecting (touching) or passing too close to a bone area. Hence, the system must mark such area as a bone area with some inhibiting values.

At block B416, other critical tissue parameters (e.g., critical organs such as large vessels) need to be considered. To that end, at block B416, the system applies critical-tissue segmentation algorithms to the volumetric data. Specifically, in addition to segmenting bone or bone-like structures, the system can segment and process the 3D data to detect other structures like a large organ, such as a lung or kidney, and major arteries or veins. The system can exclude these "other structures" from a planned insertion path. Block B416 can vary in case-by-case basis depending on the type of procedure, but the applied algorithm can be treated essentially the same as the bone mask. That is, critical organs such as large vessels need to be detected and avoided along the planed needle path.

Here, it should be noted that a planned insertion path is conceptually different from a virtual needle path. First, recall that at block B412, the system performs skin detection. After the system has detected the skin surface and determined its viable areas, the system can lay a 2D grid over the skin surface, and sample parametric values on each point of the 2D grid. The calculation is done for each point of the 2D grid, assuming that each point of the grid can be an insertion point and connecting each point with the target point. As a result, each path connecting a point of the 2D grid to the target point is called a virtual needle path. On the other hand, when talking about a planned insertion path, the parametric contour map displayed on the skin surface is considered. In this case, the user chooses an insertion point by observing the parametric contour map displayed on the skin surface, and the system produces a planned insertion path by connecting the chosen insertion point to the target point. Therefore, the planned insertion path is the path that the user has determined, based on the chosen insertion point, and this planned insertion path is just one of the virtual needle paths.

At block B420, the system receives instrument-specific parameters of the needle guide device 110, and generates a model of the needle guide device (a NGS virtual model). To generate the NGS virtual model, the system uses the instrument-specific parameters such as diameter of the base plate 111, the radius of the arc guide 113, radius of the opening 115, range of elevation angle or zenith angle, location or distance of RCM with respect to the arc guide, etc. Instrument-specific parameters may also include parameters of the needle-like probe, such as probe type, size, and/or number of probes to be used in a procedure.

At block B422, the system generates a parametric contour map. More specifically, once the 3D image data and instrument-specific parameters are processed according to blocks B402 to B420, the proposed algorithm below will calculate initial scalar values for the parametric map based on different factors that may affect the user's choice of an optimal insertion point. In this step, instrument parameters related to the NGS virtual model are used as input data along with anatomical data of the patient. Here, instrument parameters may include the dimensions, shape, limitations, etc., of the actual NGS instrument and needle to be used, whereas the anatomical data may include, for example, skin topography of the anatomical portion or of the location where the instrument will be mounted, bone and/or critical tissue (critical organs) within the reachable volume of the NGS instrument, etc. For some input parameters, the values are continuous such as the zenith angle or needle length, which may allow the user to find the optimal values on the map. For other input parameters like bone or critical tissue, the values will be binary (either valid or not), which means the planned insertion path can pass through valid parameter values, and cannot pass through regions where values are not valid. Regions where values are not valid will be assigned to an inhibit value on the map, which is subject to exclusion. Said in another way, parameters like bone or critical tissue are designated by qualitative values or qualitative data, which are measures of types represented by a binary name (e.g., good or not-good, valid or not-valid, 0 or 1).

At block B422, the system will also receive predefined color maps and weighting values (weights). The system will use the color maps and weights to calculate a scalar value field corresponding to a scalar value for each point based on designed weights from different parameters and then combined into a contour map. A scalar field is an assignment of a scalar value to each point in a space (e.g., the temperature at a point on the earth is a scalar field). That is, the system will use a pre-selected color-map and/or a pre-established table of weights to generate the contour map that is visualized on the skin surface. The details of the calculations are explained later. Generally, parameters will be grouped as numerical parameters and logical parameters. For each numerical parameter, a weight value will be assigned to indicate its importance in the final scalar value. The logical parameters are equal weighted and their relative importance depends on the sum of all weights for numerical parameters. The color map is normally assigned a rainbow color spectrum with predetermined colors assigned to minimum and maximum values. For example, in an embodiment, the color red can be used to indicate the minimum values, and purple can be used to indicate the maximum values. Naturally, other color map schemes can be pre-stored in the system's memory, and selected by the user for different visual effects.

At block B432, the system performs contour map visualization. Specifically, the system combines the various masks or segmented layers with the color and weights to generate the parametric contour map. After the contour map is generated, the system outputs the parametric contour map for visualization on the patient skin surface. At block B432, a user can choose an insertion point (a planned insertion point) based on the parametric map displayed on the patient skin surface. The planned insertion point is used to determine the position of the origin or center location for the NGS device, and this center location serves as a pivot point for determining the approximate orientation of the needle guide device on the patient so that the device model surface adapts to the skin surface of the patient. Then, the virtual model of the needle guidance device and its reachable zone are overlaid on the planning image data, in order to visualize and validate the selection of the planned insertion point. The user's choice of insertion point is validated by simulating (generating) a planned insertion path that connects the insertion point to the target point (target tumor contained in the anatomy).

Specifically, after the target point and insertion point locations have been set, the system 100 uses the NVT tool to define a planned insertion path. The system generates a 3D model representation (a virtual model) of the physical needle guidance device to be used in the procedure. The system can have stored in its memory various models of the needle guide device, which can be tailored to each specific procedure. For example, single probe ablation or multi-probe ablation or biopsy procedures can be virtually simulated before actually inserting the needle-like probe into the anatomy of the patient.

<Parameters Used for Generating Contour Map>

The parameters involved in the contour map calculations include: (a) characteristics of the tumor model, (b) physical characteristics of the actual NGS device, and (c) characteristics of the patient's anatomy.

Characteristics of the tumor model include: (a1) tumor center; (a2) tumor shape; and (a3) one or more of the long tumor axis or the short tumor axis. The tumor center is used as the target point, and is a required input for the parametric map calculation. The tumor shape, e.g., oval shape including tumor plus margin, as well as one or more of the tumor's axis are important to determine the ablation needle or needle set necessary to create an appropriate ablation zone. Generally, the tumor's longest axis direction is defined by a vector having direction and magnitude (the direction can indicate how the tumor is aligned with respect to the planned insertion point and the magnitude can indicate the size of the tumor in the direction of the planned or virtual needle path). If a difference between longest and shortest tumor axes is less than 20%, the system is configured to use a sphere model with the longest axis parameter defining the radius of the sphere. The tumor parameters is information associated with the ablation needle or needle set necessary to create a proper ablation zone, which is a sphere or oval shape aligned with the needle direction. The overlay between these two 3D objects provides the coverage information needed for ablation planning.

Characteristics of the device model include: (b1) needle guide device remote center of motion (RCM) placed at (or as close as possible to) the location of the insertion point; (b2) needle effective length from device center (i.e., depth from the needle insertion point); (b3) needle guide device elevation angle valid range; (b4) needle guide device base diameter (this may affect where the skin surface is not flat, because the needle guide device needs to be attached to the patient skin surface using adhesive tape or straps). Among the characteristics of the device model, it is also included characteristics of the needle-like probe (e.g., probe size, probe type, number of probes, etc.) to be used in a procedure. In that regard, some procedures may require a plurality of needle-like probes arranged around the target point to create a summative effect to create an appropriate ablation zone to cover the tumor and its margin.

Characteristics of the patient's anatomy include: (c1) shape of skin surface outline (e.g., curved or flat): although the insertion point may be in a flat surface, skin surface surrounding the insertion point can be curved; (c2) bone: bone needs to be avoided along the planned insertion path; (c3) critical tissue: critical tissue such as large vessels, lungs, or other organs (heart or liver) needs to be avoided along the planned insertion path.

<Calculations for Generating Parametric Contour Map>

Based on the input parameters listed above, the following parametric maps are calculated: 1: Elevation angle; 2: Needle Length; 3: Reachable Zone; 4: Bone and Critical Tissue Exclusion; 5: Angle between needle path and tumor's long axis; and 6: Contact Ratio of Skin surface touching the base surface of the needle guide device.

Elevation Angle: the elevation angle needs to be converted to zenith angle for map calculation. The minimal zenith angle is zero (0) and maximum zenith angle is about 70 degrees; the zenith angle is determined by the geometry of the needle guide device. For example, the combined thickness of the base plate 111 and rotatable ring 112 will determine the distance of the skin insertion point with respect to the arc guide 113. Similarly, the range of the elevation angle of needle 116 with respect to the plane of the rotatable ring 112 is limited by the geometric of the arc guide 113 and the combined thickness of the base plate 111 and rotatable ring 112. The rotation angle of R1 is the azimuth angle which is an arbitrary angle for placing the device; the rotation angle of R1 is unlikely to have any impact (or may have a minimum impact) on selecting the insertion point. The rotation angle of R2 determines the zenith angle of needle 116 when the needle holder 117 is moved along the arc guide 113. The zenith angle is an important parameter for governing the needle insertion direction. Usually the smaller the zenith angle (higher elevation angle), the higher confidence of accuracy for the needle insertion. For example, when the needle 116 is perpendicular to the base plate 111 of the NGS device, the weight of the needle or force of insertion will not cause deviation of the reachable zone 300 (see FIG. 3A and FIG. 3B). Therefore, a zenith angle equal to zero degrees (maximum elevation angle) is mapped to a value of 0, and a zenith angle of 70 degrees is mapped to a value of 1.0, respectively, in a range of values from 0.0 to 1.0. By assigning a range of values of 0.0 to 1.0 to the zenith angle from 0 to 70, a linear weight is currently adopted. However, it is possible to apply a certain function to describe the zenith angle with favorable factors (e.g., assigning a higher weight to a zenith angle close to zero) when necessary.

Needle length: the effective needle length (depth of insertion) needs to be calculated from the insertion point. The tip of the needle could be at a position different from the tumor center in terms of needle length. The length of the needle can be either too short or too long with respect to the tumor center. Therefore, there should be a grace region or margin to avoid. The grace region or margin to avoid is calculated ranging from 0.0 to 1.0, meaning from totally acceptable to inhibited. A normal needle length, for example, 20 cm will be used as acceptable needle length. The minimal insertion length might be 2 cm. Then the grace region will be 3 cm from the min max values. The output value is 1.0 for fully acceptable region and 0.0 for length outside min, max. Among grace region, the value will be linearly interpolated.

Reachable zone: The needle length and the elevation angle of the needle trajectory forms the reachable zone 300, which has a conical shape. A tumor segmentation with margin data is used here so that the system can calculate whether the tumor is completely inside (enclosed by) the reachable zone, partially inside, or outside of the reachable zone. If at least part of the tumor is outside of the reachable zone, the system assigns a value to the parametric map that inhibits that region from qualifying as the reachable zone. The system assigns to the inside of the reachable zone a value in a range from 0.0 to 1.0 depending on the distance from the center of the tumor to the border of the reachable zone. More specifically, the reachable zone 300 enclosing the region of interest (e.g., the tumor) is assigned a value of zero at the center of the tumor when the tumor is completely inside the reachable zone. The reachable zone without the tumor or the anatomy outside the reachable zone is assigned a value of 1.0. Any region of the anatomy assigned a value of 1.0 (or greater) is inhibited from being chosen by the user as a location for mounting the needle guide device 110. More specifically, the reachable zone 300 depends on needle length and the geometry of the NGS device, which mostly governs the minimal elevation angle and the cone's angle. The cone's side length (of the reachable zone 300) is the needle length minus the height of the arc guide 113 of NGS device 110 (see FIG. 2A-2B). In reality, however, the actual needle 116 could still be inserted a little bit further into the tumor, for example, by removing the arc guide 113 of the NGS device. Nevertheless, whether the arc guide is removed or not, it is preferable to avoid needle insertion too close to the edge of the reachable zone 300. Here too, a grace region or margin to avoid should be assigned weights to the values ranging from 0.0 to 1.0, meaning from totally acceptable to inhibited. This makes the visualization smoother.

Bone and critical tissue exclusion: Both bone and critical tissue regions are exclusive and should be marked by an inhibit value anytime a planned insertion path intersects or passes too close to such structures. In one embodiment, a value of 1.0 or greater represents an inhibit value. Also, to avoid the needle path from getting too close to the edge of the reachable zone, the calculation can include buffer region to dilate the reachable zone within a limited margin, or mark values in the margin as non-zero.

Angle between needle path and tumor's long axis: this parameter maps the planned insertion path direction with reference to the tumor's long axis. In general, it is known that an ablation needle can create a minimum volume covering ellipsoid (MVCE). An ellipsoid shape usually define three axes (a, b, c), and where it is normally assumed that axes a=c. If axis b is also close to a, c with abs(b−a)/a<0.2, it can be considered the ellipsoid very close to a sphere. If the tumor and the MVCE is close to a sphere, the planned insertion path could go in with any direction and achieve similar coverage. Then, for this case, an angle between the planned insertion path and the tumor axis will be zero, and the output value will be zero.

An angle theta can be defined between the planned insertion path direction and the tumor's long axis. When the long axis of the tumor and the planned insertion path direction are along the same vector, the system may assign a value of zero (0) to the parametric map. If the long axis of the tumor and the planned insertion path direction diverge by more than a predetermined threshold (e.g., 30 degrees or more), the system may assign a value and/or a weight. Indeed, the direction of the planned insertion path may not always be feasible to extend along the same vector as the long axis of the tumor due to some other factors such as the shape of the tumor with respect to the planned insertion path. In addition, the tumor may have a spherical shape and may not have a long axis. The angle between the planned insertion path direction and the tumor's long axis will be zero in such cases where the tumor has a spherical shape, and the angle could be removed from the final map calculation. When the angle theta can be calculated including the angle equals to zero condition mentioned above, the parameter output for such angle theta can be assigned to a value in a range from 0.0 to 1.0 equal to sin(theta) where the theta value can be in a range between 0 to 90 degrees.

Ratio of contact between Skin surface and the surface of the NGS base plate: This parameter is calculated based on the area of the base plate surface 111 of the needle guide device and the skin surface 3D geometry. When the whole area of the skin surface is close enough to the area of the base plate (i.e., when the base plate 111 touches most of the corresponding skin surface area), the system will assign a value of zero to the map. On the other hand, if there are certain areas of the base plate 111 with a gap from the skin surface, which indicates the skin surface has a curved anatomy and not a flat surface that matches the device base, the system will assign a score higher than 0.0 but generally less than 1.0. In the event that at least a portion of the base plate 111 is farther than a predetermined distance from the skin surface, the system will assign a value (a value between 0.0 and 1.0) to the map. The calculation of this ratio can use a sampling method for the area of the base plate 111, which has a shape of a disc. A grid of 1 mm by 1 mm cells can be placed on all the area of the skin surface and the skin surface location is known. The device base plane can be calculated for each location and sampled at the same (x, y) grid for its z positions. The z position difference can then be calculated, and a threshold is applied to consider if the base plate is in contact or at a threshold distance (e.g., at 1 mm) from the skin surface. Then the coverage output value can be calculated by counting all the points that fall-in the given disk samples.

Figure 8:
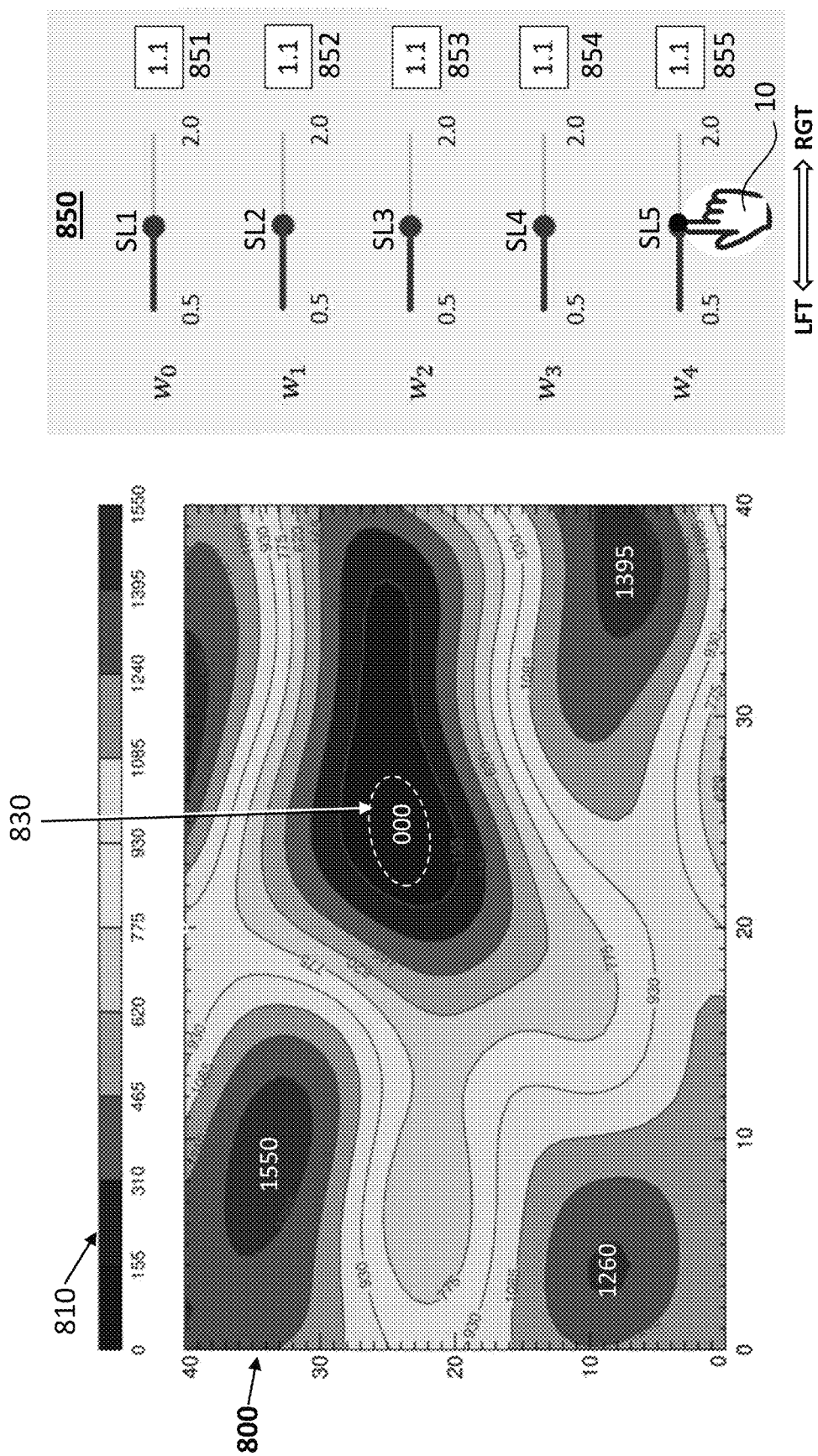
FIG. 8 illustrates an example of a parametric contour map 800 with a graphical user interface (GUI) 850.

Lastly, when the combined parametric map is calculated, a weighted average of all parameters will be used for each region of the map. Meanwhile, inhibit and non-inhibit values will be treated differently than continuous values, e.g., using logic operators, such as AND, OR, and NOT. After applying a logic operator (e.g., an OR operation), the system will assign values of 0.0 to the acceptable contour regions; and the inhibit values of 1.0 will be assigned to the maximum value. Finally, the system can apply a color map to the contour map generation. In general, the inhibit value will use a different color to be distinguished from regions with valid (non-inhibit) values. The weights will be determined empirically as initial settings. For example, a simple weights selection is that all weights i (Wi) initially equals 1.0, where i=0 to N, and N is the maximum number of parameter. In one example, the maximum number of parameters is N=4, but any other positive integer can be used as the total number of numerical parameters (depending on the complexity of the NGS device, anatomy of the patient, number of needles to be used, etc.). The weighted average formulae are described below in the "Formulae and Calculations" section for the numerical parameters. However, other initial values are possible as the default value to select the desired parameters emphasized over others. For example, the weight value range can vary in range [0.5, 2.0] (as illustrated in FIG. 8). Furthermore, the user is allowed to adjust the initial settings through the system's graphic user interface (GUI) 850 to achieve the desired visualization.

<How to Calculate Parametric Map>

To calculate values for the parametric map, we start by defining the following:
1. Input fields: Skin surface in 3D, grid sample: {(X, Y, Norm Vector in 3D)}
2. Output fields: normalized values ranging [0.0, 1.0]
3. Parametric Map: Values on (X, Y) 2D Grid, which is the output field of the calculation;
4. Parametric Contour: Given certain levels, convert parametric map into contour plot;
5. Parametric Color Table: Assign a value to color lookup table that maps [0, 255] into a continuous color that can be displayed as a color bar. Grayscale is a basic example of continuous color that can have values of 0 to 255;
6. Parametric Colored Map: Given certain color map, convert parametric map into a colored map plot that represents the values by different colors;

7. Numerical parameter: parameters with continuous value range, often normalized to range [0.0, 1.0]
8. Logical parameter: parameters that take two discrete values of {0, 1}

<Formulae and Calculations>

The Value of each pixel on the Parametric Map depends on different parameters; each of which is calculated based on the input fields.

Value on each location=Weighted sum of all numerical parameter values+Inhibit value*(OR operations of all logical parameter values). Use Low value with floor 0.0 to indicate a desired place for insertion point. Use High value reach with ceiling 1.0 as an Inhibit value to indicate that the insertion point cannot be placed in such location.

$$P_v = \frac{1}{MW+W}(T_i + WT_j) = \frac{1}{(M+1)\sum w_i}\left(\sum w_i * v_i + \sum w_i * M * (u_0 \cup u_i \ldots \cup u_j)\right)$$

Numerical Parameters:

$T_i = \Sigma w_i * v_i$ $W = \Sigma w_i$ where:

$i=[0, \ldots, 4]$ i=0: Zenith angle, V0=(angle in degrees/70) within [0.0, 1.0], W0—importance weight factor i=1: Needle length, V1=0.0 when insertion length (needle length—arc height) is in range between 2 L/5 to 3 L/5, V1=1.0 at L/5 or 4 L/5, interpolation between (L/5, 2 L/5) and (3 L/5, 4 L/5) ranges, where L is the needle length.

i=2: Reachable zone, V2=0.0 when zenith angle ≤45 degrees, V2=1.0 at 70 degrees, and interpolation values in between. The maximum zenith angle is 70 degrees. Azimuth angle range [0.0, 360.0] degrees, i.e., the needle guide device can rotate with no limits.

i=3: Angle between needle path and tumor's long axis, V3=0.0 when R≤1.2, V3=1.0 when R≥3.0, where V3=R*Sin(Theta) when R≥1.2 and R≤3.0, where R is the ratio between the length of the long axis and the length of the short axis. Where Theta is the angle between long axis and the planned insertion path direction.

i=4: Ratio of contact between base surface of needle guide device to flat skin surface, V4=0.0 when P≥0.8 and V4=1.0 when P≤0.5, interpolation between P≥0.5 and P≤0.8, where P is the ratio of sampled touched points vs total sampled points on base plate (disk) of NGS device. Define the distance between sample points on NGS device disk and on skin surface <1 mm as touched points. Sample points are on a grid of 1 mm by 1 mm cells.

Logical Parameters:

$T_j = M*(u_0 \cup u_1 \cup u_2)$, where $u_j \in \{0,1\}$

M: Maximum logical value factor is a user chosen value to govern the relative strength of the logical value against the normalized numerical values j=[0, 1, 2]

j=0: HitBoneMask (planned insertion path intersects bone structure)

j=1: HitLungMask (planned insertion path intersects critical-tissue structure (e.g., lung))

j=2: HitVesselMask (planned insertion path intersects critical-tissue structure (e.g., vessel)).

Alternative Method:
1. Use segmentation algorithms to generate Bone, Lung, or Vessel masks;
2. Sample a planned insertion path from insertion point to target point in 3D space;
3. Determine if none or the sampled locations is within the masks, return 0; otherwise, return (1*M), where M is a logical value factor defined above.

<Percutaneous Needle-Like Insertion Procedure>

A simplified workflow for a percutaneous ablation procedure includes at least the following steps. (1) Setup: includes preparing all of the system components (e.g., powering the image scanner 140, obtaining a new and sterile needle guide device 110, receiving patient information, and setting up connections between system components with DICOM protocol to acquire volumetric images from image server 200. With the volumetric images, the system can automatically register a model of the needle guide device with the image space. (2) Planning: includes scrolling through image slices, identifying a region of interest (tumor), defining a target point (center of tumor) and a skin insertion point, selecting one or more than one ablation needle based on size of the tumor, selecting needle size (diameter and length) based on distance from insertion point to target point, simulating needle insertion trajectories, and viewing an ablation model. (3) Needle Insertion: includes mounting the physical needle guide device on the patient, actuating or manipulating the needle guide device to guide one or more than one needle to the target point. (4) Procedure monitoring: includes confirming the actual position of the inserted needle with respect to the planned insertion path, performing actual needle ablation, and saving images of the procedure for reference after the ablation. MRI guided cryoablation procedures are generally performed in an MRI suite with an MRI machine, where the needle guide device is manipulated when the patient is outside of the machine bore, and the patient and needle guide device are imaged when the patient is inside the MRI machine bore. While a cryoablation procedure is described as an example, other ablation procedures such as thermal ablation procedures, or other percutaneous procedures such as image-guided biopsies, include similar processes.

Figure 5:
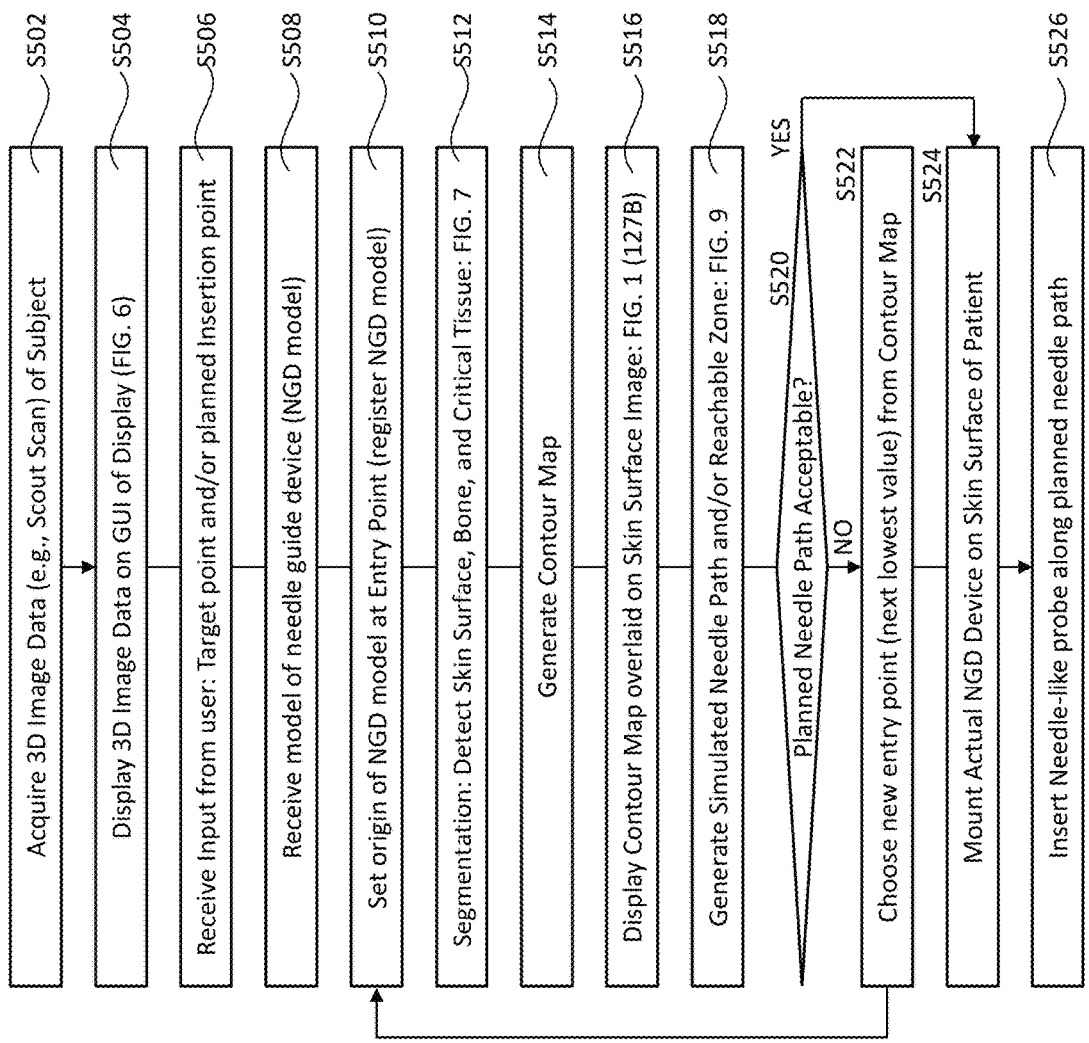
FIG. 5 illustrates a workflow for planning and simulating a virtual needle path using a needle visualization tool (NVT tool)
Figure 6B:
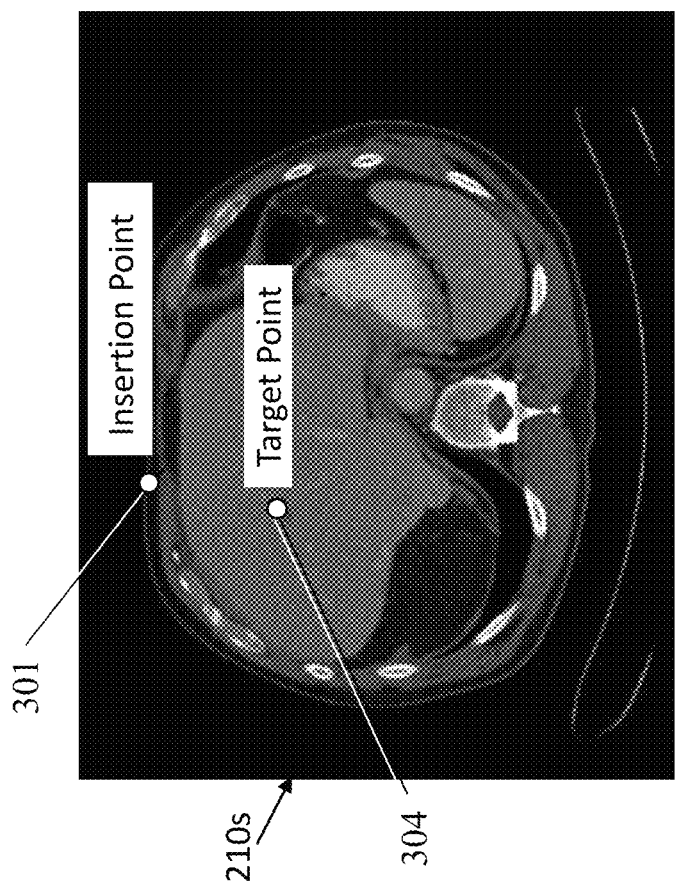
FIG. 6B shows an exemplary slice image 210s with a target point 240 and an insertion point 230.
Figure 6A:
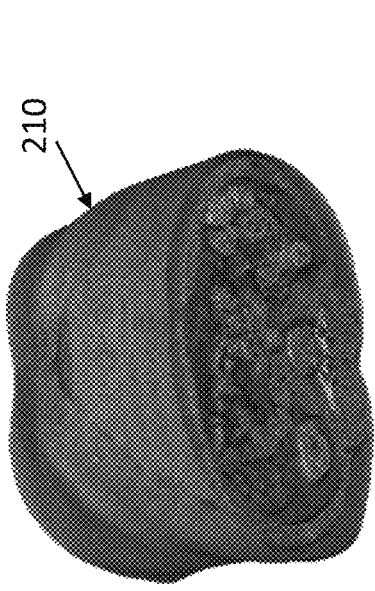
FIG. 6A shows exemplary volumetric image data 210.

FIG. 5 illustrates a workflow diagram for planning and simulating a needle path using the needle visualization tool (NVT tool), according to the present disclosure. At step S502, the system acquires volume data of a subject. The volume data can be pre-operative image data of the subject that has been previously acquired and stored either in server 200 or in the memory 122 of console 120. The volume data can also include intra-operative image data acquired in real time from the patient by the image scanner 140. At step S504, the system displays of the volumetric image data. The image data can be displayed in a graphical user interface (GUI) such as a display monitor 126A and/or display monitor 126B. FIG. 6A shows an example of volumetric image data 210. By observing and manipulating the volumetric image data 210, a user can scroll through cross-sectional images 210s of the 3D data to identify a target point 304 and a potential insertion point 301. FIG. 6B shows an example of a cross-sectional image 210s of the volumetric data 210 with a target point 304 and a potential (intended) insertion point 301. FIG. 6B is for conceptual illustration only, as it should be understood that the target point 304 and potential insertion point 301 could be in a different planes (i.e., in different cross-sectional images). At step S506, when target point 304 is identified by user, the system receives an input indicative of the location (coordinates in 3D space) of the target point 304. Information about the target point may also include the slice number and the location (e.g., x, y, z coordinates) where the target point is located. The system will use this information of the target point 304 as the target location for a planned insertion path.

Figure 6C:
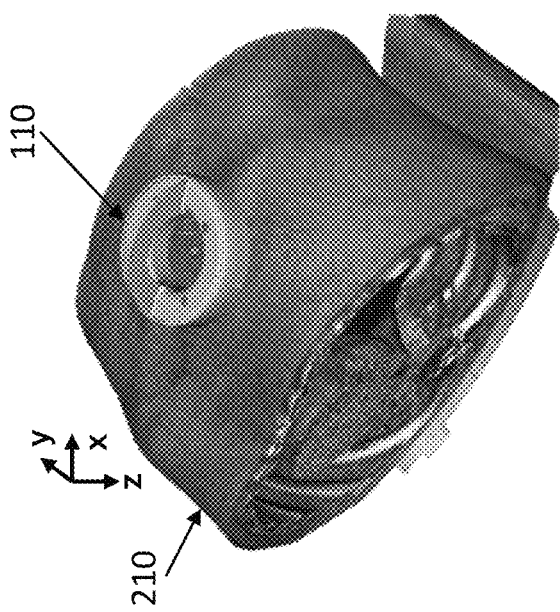
FIG. 6C illustrates a process in which a virtual model of a needle guide device is combined (registered) with the volumetric image data 210.

At step S508, the system receives a virtual model of the needle guide device 110. Instead of receiving a virtual model of the NGS device, the system may receive the geometric parameters of the actual (physical) needle guide device 110 to be used in the procedure. Instrument-specific parameters may include, for example, the diameter of the base plate 111 or diameter of rotatable ring 112, the radius of arc guide 113, the diameter of opening 115, the distance of the remote center of motion (RCM) with respect to the arc guide 113, the range of the elevation angle and/or zenith angle (e.g., the maximum and minimum elevation angle), the needle effective length from device origin to tumor center (i.e., the needle insertion depth). The system may also prompt the user to select the type, size and/or number of needles to be used for the procedure. Based on these parameters, the system can generate and place a virtual model of the needle guide device 210 on the volumetric data 210. FIG. 6C shows an example of a virtual model of needle guide device 110 arranged on the volumetric data 210.

At step S510, the system sets the origin (center point or RCM) of the model of needle guide device 110 at the insertion point 301 of the volumetric image data 210. The system also controls the orientation of the virtual model of needle guide device 110 so as to determine if the reachable zone 300 encloses the tumor 305.

At step S512, the system performs a segmentation process to determine the skin surface topography, and to detect critical structures within the anatomy of the patient. That is, at step S512, the system detects if any bones and critical structures such as organs (e.g., liver, spleen, lungs, etc.) and large vessels exists within the anatomical portion of the patient that could potentially intersect (obstruct) a planned insertion path 350.

Figure 7:
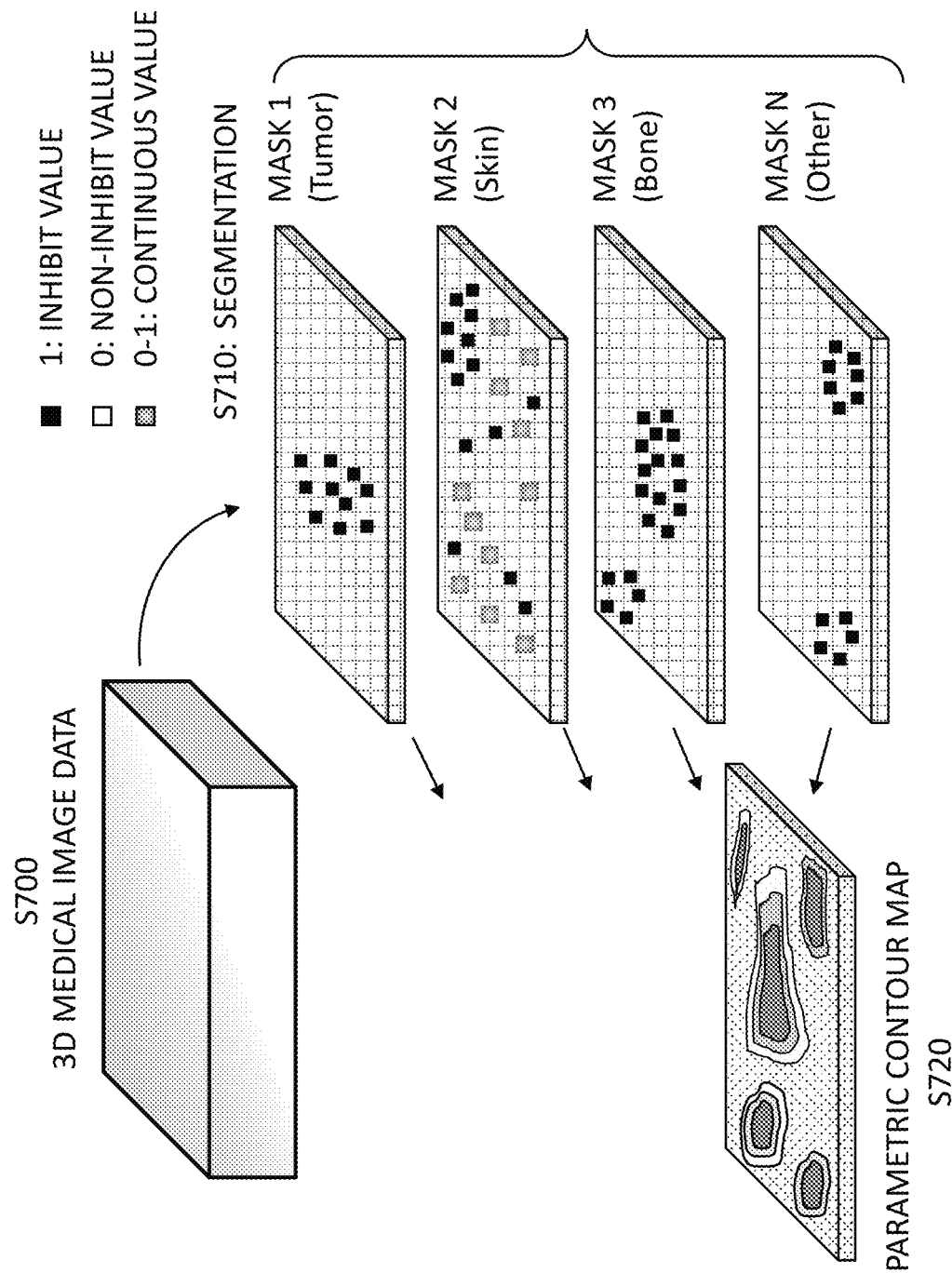
FIG. 7 illustrates an graphical representation of a segmentation process of 3D medical image data for generating a parametric map based on parameters of the anatomical portion of the patient's body and parameters of the needle guide device.

At step S514, the system uses the segmented 3D data to generate a parametric contour map 800. The process and parameters used for generating the parametric contour map 800 are already described above in reference to FIG. 3A, FIG. 3B and FIG. 4. FIG. 7 graphically illustrates an exemplary segmentation process. Initially, at step S700, the system acquires volumetric image data from one or more imaging modalities, as described above. Using the acquired volumetric data, at step S710, the system performs a segmentation process. In the segmentation process, the system analyzes the volumetric data in a voxel-by-voxel basis, and generates a plurality of N masks each corresponding to a specific structure of the medical image data For example, the system may generate a first mask (MASK 1) corresponding to a tumor model; a second mask (MARSK 2) corresponding to the topography of the skin surface; a third mask (MASK 3) corresponding to bone structure, and a N-th mask (MASK N) corresponding to other critical tissue structures such as critical organs or large vessels. Each mask provides specific regions with inhibit values and non-inhibit (allowed) values. Some of the masks provide logic values of 0 or 1, where a value of 1 is an inhibit (non-allowed) value, and a value of 0 is non-inhibit (allowed) value. Some masks may provide continuous values in a range of 0.0 to 1.0, where values at 0.0 or close thereto are the most acceptable values, and values of 1.0 or close thereto are the least desirable or non-allowed values. Based on the plurality of N masks, at step S720, the system can generate a comprehensive parametric contour map, which maps and combines all inhibit and non-inhibit values of all masks into a 2D contour map. The exemplary process shown in FIG. 7 can be implemented by well-known convolution neural networks (CNN), such as classical CNNs used for biomedical image segmentation.

FIG. 8 illustrates an example of a parametric contour map 800 with a graphic user interface (GUI) 850. Contour regions of parametric map 800 are assigned colors based on a parametric scale 810. To facilitate the user's selection of the most appropriate insertion point, the system can display preferred regions of the parametric contour map in the center portion of the display. For example, in FIG. 8, a contour region 830 having lowest elevation values (000) is shown in the center of the display. To that end, the display can be a touchscreen to allow the user to move the move the parametric contour map 800 to select the insertion point. In FIG. 1, the second image 127B illustrates an example of displaying the parametric contour map 800 superposed on top of a coronal image to assist the user (e.g., a physician) in placing the actual needle guide device 110 on the most appropriate part of the skin surface of patient 12.

In FIG. 1 and FIG. 8, the contour map 800 is for illustration purposes only. In practice, a more realistic image of the patient's anatomy can be derived from available DICOM image data. For example, at step S502 of FIG. 5, the system acquires or receives 3D medical image data from, for example, server 200 or from scanner 140. The 3D medical image data (volume data) is received in DICOM format where data information is stored in voxels. The shape of a voxel is generally considered as a cube. A voxel can have a maximum of 26 adjacent voxels, from which 6 voxels share a face, 12 voxels share an edge, and 8 voxels share only a corner in 3D space. A subset of voxel data is called a grid. A grid point represents a cell commonly referred to as a single voxel. Voxels can have multiple properties, which can be organized differently with respect to the application. Binary voxelisation is a term used to indicate that a voxel can have a property, which can take only two values: 0 (empty) or 1 (filled). Therefore, in an embodiment, the parametric map 800 can be assigned parametric values based on binary voxelisation, where each voxel can be assigned one of the two values (i.e., either 0 or 1). Other voxels can have continuous values in a predetermined range of values (for convenience, continuous values can be normalized to a range between 0.0 and 1.0). However, regardless of the manner in which the parametric contour map 800 is displayed, a feature of the present disclosure is that generating the parametric contour map 800 can help the user identify the optimal position (e.g., the most flat area of the skin surface, and/or the insertion point with least obstructions) to mount the needle guide device on the patient.

In FIG. 8, the lower value of scale 810 informs the user of the more desirable location or locations where the needle guide device 110 can be safely mounted on the patient. Referring back to FIG. 1, the parametric contour map 800 can be shown as image 127B, where map 800 is superposed on the coronal view of the patient's anatomy. The GUI 850 allows the user to interactively adjust the parameters of the needle guide device or parameters of the anatomical portion of the patient until an acceptable location for needle insertion and for mounting the needle guide device is found.

Referring again to FIG. 5, at step S516, the system displays the parametric contour map overlaid on the image data. At step S518, the system generates a simulated needle path 350 (planned insertion path), and displays the planned insertion path 350 overlaid on the image data. A process for simulating a needle path is known from, for example, applicant's previously disclosed U.S. Pat. Nos. 10,695,132 B2 and 10,856,941 B2, which are incorporated by reference herein for all purposes.

At step S520, the system prompts the user to confirm whether the planned insertion path 350 is acceptable or not. If the simulated needle path is not acceptable, the flow advances to step S522. At step S522, the user is prompted to choose a new insertion point from the parametric contour map 800. For example, the user can choose a new insertion point within a region of the parametric contour map with the next lowest value. After the user chooses the new insertion point, the flow returns to step S510. At step S510, the system again aligns the origin (center) of the NGS model at the newly selected insertion point. That is, at step S510, the system again registers (re-registers) the virtual model of the NGS device with the image data 210. The system repeats the process of steps S510 through S522 until the user confirms that the planned insertion path 350 is acceptable. When the planned insertion path 350 is acceptable (YES at S520), flow advances to S524.

Figure 9:
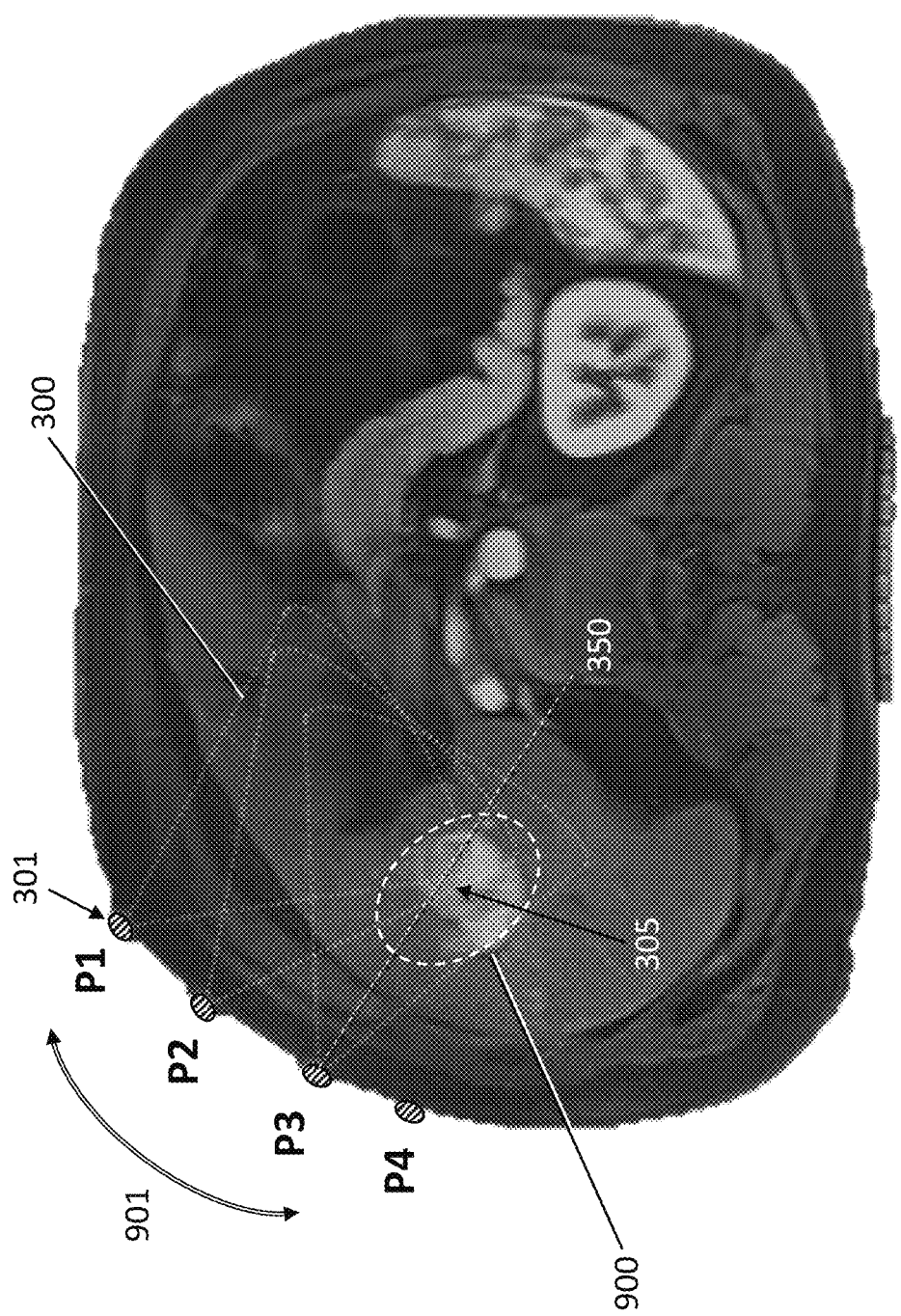
FIG. 9 illustrates a process where a user chooses an insertion point on the skin surface of a patient based on the parametric contour map 800, and the system confirms that a planned insertion path is appropriate for reaching a region of interest located within a reachable zone 300.

FIG. 9 illustrates an example process where a user changes selection of an insertion point 301 along an arcuate path 901 following the patient skin surface until an optimal insertion point 301 is selected, based on the parametric contour map 800. To confirm the insertion point is appropriate, the system can generate a planned insertion path 350 and/or a planned reachable zone 300. Initially, an insertion point 301, at a first position P1, is selected by the user at step S506 of FIG. 5 before the virtual model of needle guide device is registered with the image data 210. Then, at steps S518-S520, if the simulated needle path is not acceptable, the user changes the chosen insertion point 301 from the first position P1 to a second position P2, and from the second position P2 to a third position P3, and to fourth position P4, etc. At the first position P1, the planned reachable zone 300 does not enclose a region of interest (ROI) 900. Then, at step S522, the user choses a new insertion point from the parametric contour map 800 which corresponds to position P2 on the skin surface of the patient. At position P2, the planned reachable zone 300 still does not fully enclose the ROI 900. At position P3, the model reachable zone 300 is at the edge of ROI 900. At position P3, the user may cause the system to generate a planned insertion path 350. In some embodiments, the system may even be configured to simulate an ablation sphere to confirm that the location of the chosen insertion point is optimal for the panned needle path. If the position P3 is not the optimal position, the user may continue to choose a new insertion point at position P4, etc., along an arcuate path 901 following the patient skin surface until the optimal insertion point is found, and an appropriate planned insertion path 350 is confirmed.

At step S520, when the user confirms that the planned insertion path 350 is acceptable (YES at S520), the process flow advances to step S524. At step S524, the system prompts the user to mount the actual needle guide device 110 on the skin surface of the patient. At step S526, the user can now insert the needle 116 along the planned insertion path 350 with the confidence that the needle guide device is correctly positioned, and the needle 116 will not intersect any critical structures of the patient's anatomy.

<Software Related Disclosure>

At least certain aspects of the exemplary embodiments described herein can be realized by a computer of a system or apparatus that reads out and executes computer executable instructions (e.g., one or more programs or executable code) recorded on a storage medium (which may also be referred to as a 'non-transitory computer-readable storage medium') to perform functions of one or more block diagrams or flowchart diagrams described above. The computer may include various components known to a person having ordinary skill in the art. For example, the computer may include signal processor implemented by one or more circuits (e.g., a field programmable gate array (FPGA) or an application specific integrated circuit (ASIC)) for performing the functions of one or more of the above-described embodiment(s), by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)), and may include a network of separate computers or separate processors to read out and execute the computer executable instructions. The computer executable instructions may be provided to the computer, for example, from a cloud-based network or from the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like. The computer may include an input/output (I/O) interface to receive and/or send communication signals (data) to input and output devices, which may include a keyboard, a display, a mouse, a touch screen, touchless interface (e.g., a gesture recognition device) a printing device, a light pen, an optical storage device, a scanner, a microphone, a camera, a drive, communication cable and a network (either wired or wireless).

One or more advantages of the Parametric Contour Map for Visualization of a Needle Guide System on the Skin Surface include:

The system provides increased confidence and intuitive visualization for the user to choose the insertion point before mounting the device on patient skin surface. This reduces procedure time. Intuitive visualization contour map provides confidence for choosing the insertion location with full information and context. The parametric contour map enables better planning with good consistency between model and device. This allows the user to control the weights on different parameters to adjust the visualization results. Improves the users understanding of proper choices on insertion point, and needle path.

An algorithm is provided that brings different sources of information together and defines independent calculations for different parameters. The algorithm integrates multiple inputs into a meaningful contour map for visualization and decision-making. The algorithm combines numerical and logical parameter values in the calculations. Numerical parameters are parameters that take a single value from within continuous value range. A continuous value range is often normalized to a range from 0.0 to 1.0. Logical parameters are parameters that take one value out of two discrete values, namely 0 or 1. An example of logical value can be 0 or 1 depending on whether a planned insertion path intersects a bone, lung or other critical tissue. The weights for numerical parameters are user controlled inputs that can adjust the relative significance of different numerical and/or logical parameters and make the visualization smoother.

One aspect of the present disclosure is directed to a system configured to: use medical image data as input; apply skin detection on the medical image data to obtain skin surface data; optionally smooth the skin surface data to remove local sharp curvatures; apply bone detection on the medical image data to obtain a bone mask; apply critical tissue mask segmentation; create a tumor model; segment the tumor model and mask the target with certain margin parameters; use a needle guide device model, and needle-related parameters as inputs to generate a parametric contour map. The needle guide device model including Elevation angle range of the needle guide device, Minimum and maximum needle length, Reachable 3D conical region (reachable zone) defined by such parameters. Determine, bottom surface area (size of the needle guide device that need to be attached on skin). Calculate geometry relationship between bottom surface and reachable area.

Uses image guidance software to enable: Visualizing medical image data; Defining target center location and shape (tumor segmentation with margin).

Computing parametric contour map: 3-1 generate parametric contour map for each input which affects the insertion point selection; 3-2 compute a metric related to correspondence between skin surface of patient and bottom surface of NGS device; 3-3 merge the parametric values which affect the insertion point selection with metrics of correspondence of NGS to skin surface into one parametric contour map, and allow user to dynamically change weights of parameters for improved visualization. For example, as illustrated in FIG. 8, the graphic user interface (GUI) 850 is provided with interactive sliders (SL1, SL2, SL3, SL4, SL5, etc.) configured to allow the user to interactively change the weights (Wi) of the numerical parameters until optimal visualization of planning is achieved. In this embodiment, user 10 can move a slider to the left [LET] or to the right [RGT] to respectively lower or increase the weights (Wi) of the numerical parameters. The effect of the adjustment can be observed by the change in color of each region of the parametric contour map, or by the change in numerical values in tiles 851, 852, 853, 854, 855 for each of weights W0 to W4 respectively. In other embodiments, the sliders can be moved vertically, or GUI 850 can allow the user to directly enter a numerical value for each parameter by touching tiles 851-855.

Displaying the parametric contour map on a smoothed skin surface using color maps. 4-1 allow user to adjust the weight for different parameters on contour map; 4-2 identify the excluded area (or areas) vs the viable area or areas, and select the center of a relative large viable area for optimal insertion location candidate.

Select optimal skin insertion point using parametric contour map. 5-1 further integrate the selection of the skin insertion point into the rest of needle guide workflow. Needle planning will be determined by the tumor center and insertion point selection. NGS device will be placed on the insertion point based on user's selection. User selection of insertion point is not based solely on the morphology of the skin surface. Instead, as explained above, the parametric map also includes parametric values indicative of bone detection, critical organs, etc., each assigned a given weight.

Computing parametric contour map: 3-1 each input parameter will be calculated based on spatial relationship between skin surface and target location determined by the tumor center and other tumor model parameters such as longest axis; 3-2 the parameters that are contributing to the final map are categorized as the following: Elevation angle, Needle length, Reachable zone, Bone and critical tissue exclusion; and Angle between needle path and tumor's long axis. 3-3 compute the combined parametric contour map; 3-4 apply color map and transparency for display.

Displaying the parametric contour map: 4-1 the skin surface is smoothed and suitable to display the contour map or color map; 4-2 when combining multiple parameters into one the weighted average values are calculated for general values; however, the inhibit value which indicates that areas are impossible to reach will follow logic OR operation; 4-3 the combined parametric map is generated by selecting an adjustable scale range with the inhibit value assigned to the maximum value for applying final color map and contour map generation. The inhibit value will generally use a different color to distinguish from regions with valid values.

In the above embodiments, percutaneous ablation or biopsy procedures using visualization of a parametric contour map displayed over a patient's skin surface can be performed in substantially less time and with better accuracy, potentially resulting in less radiation and/or better tumor treatment, than similar procedures conducted without the 3D parametric visualization.

OTHER EMBODIMENTS AND MODIFICATION THEREOF

In referring to the description, specific details are set forth in order to provide a thorough understanding of the examples disclosed. In other instances, well-known methods, procedures, components and circuits have not been described in detail as not to unnecessarily lengthen the present disclosure. Unless defined otherwise herein, all technical and scientific terms used herein have the same meaning as commonly understood by persons of ordinary skill in the art to which this disclosure belongs. In that regard, breadth and scope of the present disclosure is not limited by the specification or drawings, but rather only by the plain meaning of the claim terms employed.

In describing example embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

Any patent, pre-grant patent publication, or other disclosure, in whole or in part, that is said to be incorporated by reference herein is incorporated only to the extent that the incorporated materials do not conflict with standard definitions or terms, or with statements and descriptions set forth in the present disclosure. As such, and to the extent necessary, the disclosure as explicitly set forth herein supersedes any conflicting material incorporated by reference.

What is claimed is:

1. A system for generating a planned insertion path for guiding a needle-like tool using a parametric contour map, the system comprising:
   a needle guide device that operates to: (i) guide the needle-like tool, and (ii) be mounted on a skin surface of a body of a patient; and one or more processors that operate to:
acquire medical image data of an anatomical portion of the body of the patient that contains a target tumor to be treated by percutaneous intervention with the needle-like tool;
generate the parametric contour map by combining parameters of the anatomical portion and parameters of the needle guide device, the parametric contour map having a plurality of contour regions, where one or more contour regions of the plurality of contour regions have an elevation or depth value different from an elevation or depth value of another contour region of the plurality of contour regions;
overlay the parametric contour map on an image of the skin surface and of the anatomical portion;
display, on a display device, the parametric contour map overlaid on the image of the skin surface and of the anatomical portion;
select an insertion point on the displayed and overlaid parametric contour map based on an input received via an interaction with the displayed and overlaid parametric contour map;
based on the received input, generate the planned insertion path for guiding the needle-like tool from the selected insertion point of the displayed and overlaid parametric contour map to the target tumor within the anatomical portion of the body of the patient; and
determine whether the planned insertion path for the selected insertion point is acceptable or not based on: (i) detecting whether or not the planned insertion path intersects with one or more structures, the one or more structures being one or more bones of the patient, one or more organs of the patient, or one or more vessels of the patient and, in a case where the planned insertion path is not intersecting with the one or more structures, then determining that the planned insertion path is acceptable, or (ii) a second received input, wherein the second received input is received by a user and indicates whether the planned insertion path is acceptable or not to the user;
wherein, in response to determining that the planned insertion path is acceptable, the one or more processors further operate to:
indicate, on the display device, that the needle guide device is ready to be mounted and/or used,
and wherein, in response to determining that the planned insertion path is not acceptable, the one or more processors further operate to:
select a new insertion point and generate a new planned insertion path on the displayed and overlaid parametric contour map, and/or
update one or more of the parameters of the anatomical portion and/or one or more of the parameters of the needle guide device to generate a new parametric contour map for overlaying on the image and select a new insertion point for the new parametric contour map, wherein the one or more of the parameters of the anatomical portion and/or the one or more of the parameters of the needle guide device are updated via one or more inputs or interactions with a control panel or a Graphical User Interface (GUI) shown on the display device.

2. The system according to claim 1,
wherein the selected insertion point of the parametric contour map or the selected new insertion point of the new parametric contour map corresponds to a substantially flat region of the skin surface to be used as a center location for mounting the needle guide device on the skin surface of the body of the patient.

3. The system according to claim 1,
wherein the one or more processors generate the parametric contour map by assigning either a quantitative value or a qualitative value to each of the parameters of the anatomical portion and to each of the parameters of the needle guide device, combining the quantitative and/or qualitative values for each of the parameters of the anatomical portion and for each of the parameters of the needle guidance device into a two dimensional grid to define a parametric map, and converting the parametric map into the parametric contour map such that the parametric contour map is a two dimensional map image representing three-dimensional information including the elevation or depth values, the quantitative values being continuous numerical values in a range of 0.0 to 1.0 and the qualitative values being logical values of 0 or 1.

4. The system according to claim 3,
wherein the one or more processors further operate to set a weighted average value for each of the parameters of the anatomical portion and for each of the parameters of the needle guide device used to generate the parametric contour map, the weighted average value being set based on a weighted sum of the quantitative values and/or based on applying a logic operator to the qualitative values.

5. The system according to claim 4,
wherein the one or more processors further operate to allow the user to enter an input to interactively change the weighted average value for each of the parameters of the anatomical portion and for each of the parameters of the needle guide device used to generate the parametric contour map to optimize visualization of the planned insertion path, the input being entered via the control panel or the GUI being shown on the display device, and
wherein, in a case where at least one weighted average value is adjusted by the user via the control panel or the GUI being shown on the display device, the one or more processors further operate to change, in real time, one or more colors of the parametric contour map and the planned insertion path.

6. The system according to claim 3,
wherein one or more of the parameters of the anatomical portion include:
a skin surface topography, a bone structure, a critical tissue presence, a geometry of the target tumor within the anatomical portion, or any combination of the skin surface topography, the bone structure, the critical tissue presence, or the geometry of the target tumor within the anatomical portion.

7. The system according to claim 6,
wherein the one or more processors further operate to apply skin detection on the medical image data to obtain a skin surface profile of the skin surface topography, and
wherein the one or more processors operate to assign a numerical value in a range of 0.0 to 1.0 to regions of the parametric contour map and/or the new parametric contour map corresponding to the skin surface topography.

8. The system according to claim 7,
wherein the one or more processors further operate to assign a numerical value of 0.0 to flat regions of the skin surface that are acceptable for mounting the needle guide device, and
wherein the one or more processors further operate to assign a numerical value of 1.0 to non-flat regions of the skin surface that are not acceptable for mounting the needle guide device.

9. The system according to claim 6,
wherein the one or more processors further operate to apply bone detection on the medical image data to obtain a bone mask profile corresponding to one or more bones included within the anatomical portion,
wherein, in a case where the bone mask profile includes at least one region with high Hounsfield Unit (HU) values, the one or more processors further operate to determine that the high HU values are higher than a threshold and indicate that the at least one region with the high HU values is intersecting, touching, or passing too close to the one or more bones such that the at least one region with high HU values is non-acceptable for generating the planned insertion path, and
wherein the one or more processors further operate to assign an inhibit value to a region of the parametric contour map that includes high HU values being higher than the threshold and/or to a region of the new parametric contour map that includes high HU values being higher than the threshold such that the inhibit value represents that the at least one region with high HU values is non-acceptable for generating the planned insertion path.

10. The system according to claim 6,
wherein the one or more processors further operate to apply critical tissue segmentation on the medical image data to obtain a critical tissue mask profile corresponding to one or more critical organs contained within the anatomical portion,
wherein, in a case where the critical tissue mask profile includes at least a region corresponding to a critical organ, the one or more processors further operate to determine that the region corresponding to the critical organ is non-acceptable for generating the planned insertion path, and
wherein the one or more processors further operate to assign an inhibit value to a region of the parametric contour map that corresponds to the critical organ and/or to a region of the new parametric contour map that corresponds to the critical organ such that the inhibit value represents that the region of the parametric contour map and/or the new parametric contour map that corresponds to the critical organ is non-acceptable for generating the planned insertion path.

11. The system according to claim 6,
wherein the one or more processors further operate to apply tumor model segmentation on the medical image data to obtain a tumor model profile corresponding to the geometry of the target tumor contained within the anatomical portion, and
wherein, in a case where the tumor model profile includes a substantially spherical region or a substantially oval region of the anatomical portion, the one or more processors generate the planned insertion path by connecting the insertion point selected by the user to a geometric center of the tumor model profile.

12. The system according to claim 1,
wherein the needle guide device includes a base plate, a rotatable ring, an arc guide, and a needle holder,
wherein the base plate is a substantially flat disc that operates to be mounted on the skin surface of the patient's body, the rotatable ring is mounted on the base plate and operates to rotate on top of the base plate around a first rotation axis which is perpendicular to the base plate, the arc guide is mounted on the rotatable ring so as to be perpendicular to the base plate, and the needle holder is mounted on the arc guide and operates to move along the arc guide in an arcuate path so as to change an elevation angle of the needle-like tool with respect to the base plate, and
wherein, in a case where the needle-like tool is mounted on the needle holder, the elevation angle of the needle-like tool operates to be changed from a minimum elevation angle to a maximum elevation angle.

13. The system according to claim 12, wherein the parameters of the needle guide device include:
an elevation angle range of the needle-like tool mounted on the needle guide device;
an effective length of the needle-like tool which is calculated from the insertion point on the skin surface to a geometric center of the target tumor;
an angle between the planned insertion path and an axis of the target tumor;
a ratio of contact between a surface area of the rotatable base to a surface area of the skin surface on which the needle guide device is mounted, or
any combination of the elevation angle range of the needle-like tool mounted on the needle guide device, the effective length of the needle-like tool which is calculated from the insertion point on the skin surface to the geometric center of the target tumor, the angle between the planned insertion path and the axis of the target tumor, or the ratio of contact between the surface area of the rotatable base to the surface area of the skin surface on which the needle guide device is mounted.

14. The system according to claim 13,
wherein the one or more processors assign a numerical value in a range of 0.0 to 1.0 to regions of the parametric contour map corresponding to the elevation angle range and/or to regions of the new parametric contour map corresponding to the elevation angle range.

15. The system according to claim 14,
wherein the one or more processors assign a numerical value of 0.0 to regions of the parametric contour map corresponding to a maximum elevation angle that is acceptable for needle insertion and/or to regions of the new parametric contour map corresponding to a maximum elevation angle that is acceptable for needle insertion, and
wherein the one or more processors assign a numerical value of 1.0 to regions of the parametric contour map corresponding to a minimum elevation angle that is not acceptable for needle insertion and/or to regions of the new parametric contour map corresponding to a minimum elevation angle that is not acceptable for needle insertion.

16. The system according to claim 13,
wherein the one or more processors assign a numerical value in a range of 0.0 to 1.0 to regions of the parametric contour map corresponding to the ratio of contact between the surface area of the rotatable base to the surface area of the skin surface on which the needle guide device is mounted and/or to regions of the new parametric contour map corresponding to the ratio of contact between the surface area of the rotatable base to the surface area of the skin surface on which the needle guide device is mounted.

17. The system according to claim 16,
wherein the one or more processors assign a numerical value of 0.0 to regions of the parametric contour map corresponding to a maximum contact between the surface area of the rotatable base to the surface area of the skin surface and/or to regions of the new parametric contour map corresponding to a maximum contact between the surface area of the rotatable base to the surface area of the skin surface, and
wherein the one or more processors assign a numerical value of 1.0 to regions of the parametric contour map corresponding to no contact between the surface area of the rotatable base to the surface area of the skin surface and/or to regions of the new parametric contour map corresponding to no contact between the surface area of the rotatable base to the surface area of the skin surface.

18. A method for generating a planned insertion path for guiding a needle-like tool using a parametric contour map and using a needle guide device that operates to: (i) guide the needle-like tool, and (ii) be mounted on a skin surface of a body of a patient, the method comprising:
acquiring medical image data of an anatomical portion of the body of the patient that contains a target tumor to be treated by percutaneous intervention with the needle-like tool;
generating the parametric contour map by combining parameters of the anatomical portion and parameters of the needle guide device, the parametric contour map having a plurality of contour regions, where one or more contour regions of the plurality of contour regions have an elevation or depth value different from an elevation or depth value of another contour region of the plurality of contour regions;
overlaying the parametric contour map on an image of the skin surface and of the anatomical portion;
displaying, on a display device, the parametric contour map overlaid on the image of the skin surface and of the anatomical portion;
selecting an insertion point on the displayed and overlaid parametric contour map based on an input received via an interaction with the displayed and overlaid parametric contour map;
based on the received input, generating the planned insertion path for guiding the needle-like tool from the selected insertion point of the displayed and overlaid parametric contour map to the target tumor within the anatomical portion of the body of the patient;
determining whether the planned insertion path for the selected insertion point is acceptable or not based on: (i) detecting whether or not the planned insertion path intersects with one or more structures, the one or more structures being one or more bones of the patient, one or more organs of the patient, or one or more vessels of the patient and, in a case where the planned insertion path is not intersecting with the one or more structures, then determining that the planned insertion path is acceptable, or (ii) a second received input, wherein the second received input is received by a user and indicates whether the planned insertion path is acceptable or not to the user;
and, in response to determining that the planned insertion path is acceptable, indicating, on the display device, that the needle guide device is ready to be mounted and/or used, or
in response to determining that the planned insertion path is not acceptable, selecting a new insertion point and generating a new planned insertion path on the displayed and overlaid parametric contour map, and/or updating one or more of the parameters of the anatomical portion and/or one or more of the parameters of the needle guide device, generating a new parametric contour map for the overlaying step, and selecting a new insertion point for the new parametric contour map, wherein the one or more of the parameters of the anatomical portion and/or the one or more of the parameters of the needle guide device are updated via one or more inputs or interactions with a control panel or a Graphical User Interface (GUI) shown on the display device.

19. The method according to claim 18,
wherein generating the parametric contour map includes assigning either a quantitative value or a qualitative value to each of the parameters of the anatomical portion and to each of the parameters of the needle guide device, combining the quantitative and/or qualitative values for each of the parameters of the anatomical portion and for each of the parameters of the needle guidance device into a two dimensional grid to define a parametric map, and converting the parametric map into the parametric contour map such that the parametric contour map and/or the new parametric contour map is a two dimensional map image representing three-dimensional information including the elevation or depth values, the quantitative values being continuous numerical values in a range of 0.0 to 1.0 and the qualitative values being logical values of 0 or 1.

20. The method according to claim 19, further comprising:
setting a weighted average value for each of the parameters of the anatomical portion and for each of the parameters of the needle guide device used to generate the parametric contour map, the weighted average value being set based on a weighted sum of the quantitative values and/or based on applying a logic operator to the qualitative values;
changing, via one or more inputs and/or via an interaction on or using the control panel or the GUI shown on the display device, the weighted average value for each of the parameters of the anatomical portion and for each of the parameters of the needle guide device used to generate the parametric contour map to optimize visualization of the planned insertion path; and
changing, in real time, one or more colors of the parametric contour map and the planned insertion path.

21. A non-transitory storage medium having stored thereon executable instructions, which, when executed by a processor, cause the processor to implement a method for generating a planned insertion path for guiding a needle-like tool using a parametric contour map and using a needle guide device that operates to: (i) guide the needle-like tool, and (ii) be mounted on a skin surface of a body of a patient, the method comprising:
acquiring medical image data of an anatomical portion of the body of the patient that contains a target tumor to be treated by percutaneous intervention with the needle-like tool;

generating the parametric contour map by combining parameters of the anatomical portion and parameters of the needle guide device, the parametric contour map having a plurality of contour regions, where one or more contour regions of the plurality of contour regions have an elevation or depth value different from an elevation or depth value of another contour region of the plurality of contour regions;

overlaying the parametric contour map on an image of the skin surface and of the anatomical portion;

displaying, on a display device, the parametric contour map overlaid on the image of the skin surface and of the anatomical portion;

selecting an insertion point on the displayed and overlaid parametric contour map based on an input received via an interaction with or using the displayed and overlaid parametric contour map;

based on the received input, generating the planned insertion path for guiding the needle-like tool from the selected insertion point of the displayed and overlaid parametric contour map to the target tumor within the anatomical portion of the body of the patient;

determining whether the planned insertion path for the selected insertion point is acceptable or not based on: (i) detecting whether or not the planned insertion path intersects with one or more structures, the one or more structures being one or more bones of the patient, one or more organs of the patient, or one or more vessels of the patient and, in a case where the planned insertion path is not intersecting with the one or more structures, then determining that the planned insertion path is acceptable, or (ii) a second received input, wherein the second received input is received by a user and indicates whether the planned insertion path is acceptable or not to the user;

and, in response to determining that the planned insertion path is acceptable, indicating, on the display device, that the needle guide device is ready to be mounted and/or used, or in response to determining that the planned insertion path is not acceptable, selecting a new insertion point and generating a new planned insertion path on the displayed and overlaid parametric contour map to obtain an acceptable insertion path based on a received input, and/or updating one or more of the parameters of the anatomical portion and/or one or more of the parameters of the needle guide device, generating a new parametric contour map for the overlaying step, and selecting a new insertion point for the new parametric contour map, wherein the one or more of the parameters of the anatomical portion and/or the one or more of the parameters of the needle guide device are updated via one or more inputs or interactions with a control panel or a Graphical User Interface (GUI) shown on the display device.

* * * * *